United States Patent
Craib et al.

(10) Patent No.: US 11,704,593 B1
(45) Date of Patent: *Jul. 18, 2023

(54) APPARATUSES AND METHODS FOR EVALUATION OF PROFFERED MACHINE INTELLIGENCE IN PREDICTIVE MODELLING USING CRYPTOGRAPHIC TOKEN STAKING

(71) Applicant: Numerai, Inc., San Francisco, CA (US)

(72) Inventors: Richard Malone Craib, San Francisco, CA (US); Geoffrey Bradway, San Francisco, CA (US); Alexander Dunn, San Francisco, CA (US)

(73) Assignee: Numerai Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/475,041

(22) Filed: Sep. 14, 2021

Related U.S. Application Data

(63) Continuation of application No. 15/937,227, filed on Mar. 27, 2018, now Pat. No. 11,164,107.
(60) Provisional application No. 62/648,595, filed on Mar. 27, 2018, provisional application No. 62/477,235, filed on Mar. 27, 2017.

(51) Int. Cl.
*G06N 99/00* (2019.01)
*G06N 20/00* (2019.01)
(Continued)

(52) U.S. Cl.
CPC ............ *G06N 20/00* (2019.01); *G06N 5/04* (2013.01); *H04L 67/104* (2013.01)

(58) Field of Classification Search
CPC ......... G06F 21/64; H04L 9/50; H04L 9/3239; H04L 63/105; H04L 2209/56;
(Continued)

(56) References Cited

U.S. PATENT DOCUMENTS

| 2016/0125299 A1* | 5/2016 | Lee | G06N 20/00 706/12 |
|---|---|---|---|
| 2016/0132787 A1* | 5/2016 | Drevo | G06N 20/10 706/12 |

(Continued)

OTHER PUBLICATIONS

Dwork C. et al. "Generalization in Adaptive Data Analysis and Holdout Reuse," NIPS Proceedings, 2015, 9 pages. Retrieved online: http://papers.nips.cc/paper/5993-generalization-in-adaptive-data-analysisand-holdout-reuse.pdf.

(Continued)

*Primary Examiner* — Abdullahi E Salad
(74) *Attorney, Agent, or Firm* — Cooley LLP

(57) ABSTRACT

A method of improving performance of machine learning models by leveraging crowdsourced artificial intelligence includes sending first data to a plurality of data source compute nodes and receiving indications of stakes and estimates based on the first data from the plurality of data source compute nodes. Each data source compute node is ranked based on the received indications of stakes, to generate a plurality of ranked data source compute nodes. An accuracy of each received estimate is calculated by comparing the received estimates to second data. Until a predefined resource is depleted, and in order of rank, if the accuracy of the estimate associated with a ranked data source compute node exceeds a predefined threshold, the predefined resource is decremented and a token augmentation can be assigned to the ranked data source compute node.

20 Claims, 6 Drawing Sheets

(51) Int. Cl.
*G06N 5/04* (2023.01)
*H04L 29/08* (2006.01)
*H04L 67/104* (2022.01)

(58) Field of Classification Search
CPC ......... H04L 67/10; H04L 67/104; G06N 5/04; G06N 20/00; G06N 20/20
See application file for complete search history.

(56) References Cited

U.S. PATENT DOCUMENTS

| | | | |
|---|---|---|---|
| 2016/0379136 A1* | 12/2016 | Chen | G06F 21/552 706/14 |
| 2017/0053215 A1* | 2/2017 | Attenberg | G06N 5/02 |
| 2018/0060744 A1* | 3/2018 | Achin | G06N 5/04 |
| 2019/0073244 A1* | 3/2019 | Fung | H04L 41/0893 |

OTHER PUBLICATIONS

Hardt M. "Adaptive data analysis," Moody Rd, 2015, 10 pages. Retrieved online: http://blog.mrtz.org/2015/12/14/adaptive-data-analysis.html.
Hardt M. "Competing in a data science contest without reading the data," Moody Rd, 2015, 13 pages. Retrieved online: http://blog.mrtz.org/2015/03/09/competition.html.
Wood G. "Ethereum: A Secure Decentralized Generalised Transaction Ledger," 32 pages. Retrieved online Dec. 27, 2018: http://gavwood.com/paper.pdf.

* cited by examiner

APPARATUSES AND METHODS FOR EVALUATION OF PROFFERED MACHINE INTELLIGENCE IN PREDICTIVE MODELLING USING CRYPTOGRAPHIC TOKEN STAKING

CROSS-REFERENCE TO RELATED APPLICATIONS

This application is a continuation of U.S. application Ser. No. 15/937,227, filed Mar. 27, 2018, which claims the benefit of U.S. Provisional Patent Application No. 62/477,235, filed Mar. 27, 2017, and of U.S. Provisional Patent Application No. 62/648,595, filed Mar. 27, 2018, each of which is incorporated by reference herein in its entirety.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present disclosure relates to machine learning, and more specifically, to improving performance of machine learning models by leveraging crowdsourced artificial intelligence.

BACKGROUND

Machine learning is a subfield of computer science that relates to computers automatically learning without being supervised.

SUMMARY

A method of improving performance of machine learning models by leveraging crowdsourced artificial intelligence includes sending first data to a plurality of data source compute nodes and receiving indications of stakes and estimates based on the first data from the plurality of data source compute nodes. Each data source compute node is ranked based on the received indications of stakes, to generate a plurality of ranked data source compute nodes. An accuracy of each received estimate is calculated by comparing the received estimates to second data. Until a predefined resource (or "feedback resource") is depleted, and in order of rank, if the accuracy of the estimate associated with a ranked data source compute node exceeds a predefined threshold, the predefined resource is decremented and a token augmentation can be assigned to the ranked data source compute node.

In some embodiments, a method includes sending first data to each data source compute node ("DSCN") of a plurality of DSCNs. Estimates based on the first data, and indications of stakes, are received (e.g., via an application programming interface ("API")) from each DSCN of the plurality of DSCNs. An indication of a predefined resource is stored in memory. Each DSCN of the plurality of DSCNs is ranked based on the received indications of stakes, to generate a plurality of ranked data source compute nodes. An accuracy of each received estimate is calculated, via a processor, by comparing the received estimates to second data. For a first ranked DSCN from the plurality of ranked DSCNs, the predefined resource is decremented and a token augmentation is assigned to the first ranked DSCN if the accuracy of the estimate associated with the first ranked DSCN exceeds a predefined threshold (e.g., if logloss <-ln (0.5)). For each remaining ranked DSCN from the plurality of ranked DSCNs, a value associated with the predefined resource is determined, and if the value is greater than zero, the predefined resource is decremented and a token augmentation is assigned to the ranked DSCN if the accuracy of the estimate associated with the ranked DSCN exceeds the predefined threshold. The method can also include receiving, from each DSCN of the plurality of DSCNs, an indication of a confidence level, and the ranking of each DSCN of the plurality of DSCNs can further be based on the received indications of confidence level. The predefined resource can be defined by a smart contract, and decrementing the predefined resource can include modifying or replacing the smart contract. The method can also include calculating, via the processor, a consistency of each received estimate, and decrementing the predefined resource and assigning the token augmentation to the first ranked DSCN can be further predicated on the estimate associated with the first ranked DSCN having a consistency of at least 75%.

In some embodiments, a method includes sending first data (e.g., including target data, feature data, identifier data, era data, and/or indications of data type), for example in response to a download request received from the first DSCN, from a host node to each DSCN of a plurality of DSCNs. The sending of the first data can be via an application programming interface ("API"). An indication of stake is received at the host node from each DSCN of the plurality of DSCNs. In response to receiving the indications of stake, a stake identifier is sent to each DSCN of the plurality of DSCNs. A target estimate based on the first data and associated with the target data is received at the host node from each DSCN of the plurality of DSCNs. A predictive accuracy value associated with the target estimate is calculated at the host node for each received target estimate. The calculated predictive accuracy values associated with the target estimates are stored. The method can also include sending, in response to receiving the indications of stake, and to each DSCN of the plurality of DSCNs, at least one of: a stake status, a transaction hash, or an indication of a stake value.

In some implementations, the method also includes calculating a consistency value associated with the target estimate at the host node and for each received target estimate.

In some implementations, the method also includes calculating an originality value associated with the target estimate at the host node and for each received target estimate.

In some implementations, the method also includes calculating a concordance value associated with the target estimate at the host node and for each received target estimate.

In some implementations, the method also includes calculating a consistency value associated with the target estimate, an originality value associated with the target estimate and a concordance value associated with the target estimate, at the host node and for each received target estimate, and sending a signal to cause the calculated predictive accuracy values, the consistency values, and the originality values to be viewable to each DSCN of the plurality of DSCNs.

In some embodiments, a method includes storing an indication of a predefined divisible resource in memory. Each DSCN of a plurality of DSCNs is ranked based on indications of stakes received from each DSCN of the plurality of DSCNs (and, optionally, based on indications of confidence received from each DSCN of the plurality of DSCNs), to generate a plurality of ranked DSCNs. An accuracy of a target probability estimate received from the DSCN is calculated, via a processor and for each DSCN of the plurality of DSCNs, by comparing the received target probability estimate to a stored dataset. For a first ranked DSCN of the plurality of ranked DSCNs, the predefined divisible resource is decremented and a value augmentation is assigned to the first ranked DSCN if the accuracy of the target probability estimate associated with the first ranked DSCN exceeds a predefined threshold (e.g., if logloss <-ln (0.5)). For each remaining ranked DSCN of the plurality of ranked DSCNs, a value associated with the predefined divisible resource is determined. If the value is greater than zero, the predefined divisible resource is decremented and a value augmentation is assigned to the ranked DSCN if the accuracy of the target probability estimate associated with the ranked DSCN exceeds the predefined threshold. The value augmentation can have a value of s/c, where "s" is associated with the indication of stake, and "c" is associated with the indication of confidence.

In some implementations, the method also includes calculating, for a DSCN of the plurality of DSCNs, a consistency value associated with the target probability estimate received from that DSCN, and excluding that DSCN from the plurality of ranked DSCNs if the consistency value is below 75%.

BRIEF DESCRIPTION OF THE DRAWINGS

It is to be understood that the drawings primarily are for illustrative purposes and are not intended to limit the scope of the subject matter described herein.

DETAILED DESCRIPTION

Figure 1:
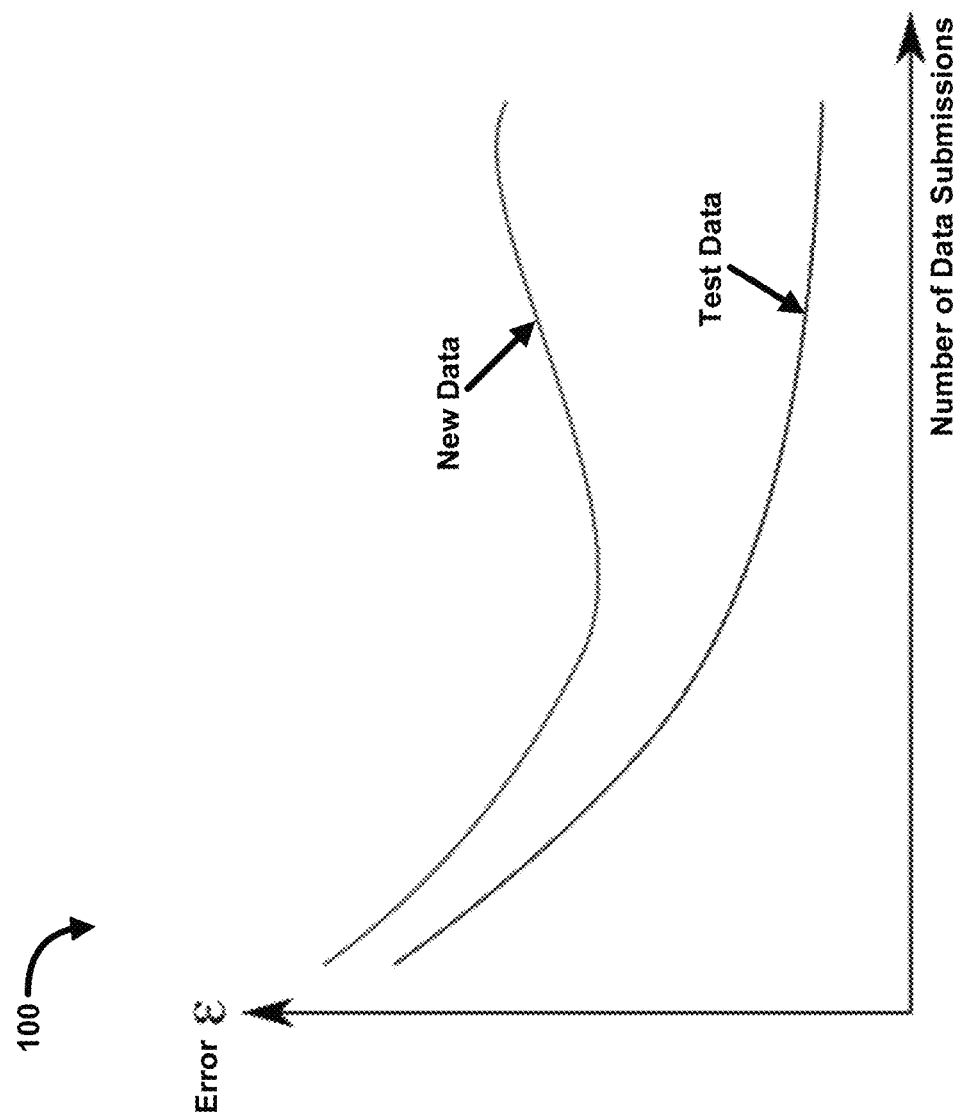
FIG. 1 illustrates an overfitting curve showing an inverse relationship between test error and new data.

Machine learning environments (e.g., for the predictive modeling and categorization of complex data objects), when competitive, can be susceptible to intentional overfitting caused by participant nodes of the competition. For example, during a machine learning competition in which competitor/participant nodes can upload estimates, there can be an implicit incentive for participants to "overfit" their data to a set of historical data (e.g., training data received from a host system that is administering the competition). Particularly, when the accuracy of the participant nodes' estimates dictates their "reward" (e.g., pecuniary winnings). As such, the participant nodes may intentionally overfit their models. In the machine learning context, all types of overfitting, including intentional overfitting, of submitted data can reduce a machine-learned model's predictive accuracy.

Apparatuses and methods of the present disclosure can help to mitigate problems associated with intentional overfitting by using cryptographic tokenization for coordinating machine intelligence activities. In some embodiments, novel cryptographic tokens are used as part of a novel iterative estimate evaluation and value allocation mechanism that disincentivizes overfitting and/or renders overfitting unfeasible and/or economically irrational. Approaches to machine learning set forth herein (e.g., including one or more novel iterative estimate evaluation and value allocation mechanisms) can lead to equilibrium or near-equilibrium bidding behavior that makes apparent (either explicitly or implicitly) how confident a contributing compute node (also referred to herein as a "bidder," "contributor" node, "source" node, or a "data source compute node" ("DSCN")) is in the estimate data that it is providing via the machine learning environment. In other words, the bidding behavior is indicative of a model confidence level associated with the contributor node (e.g., presumed to be a "rational" source or actor). The confidence level, if specified by the contributor node, is a degree of confidence that the contributor node has in the ability of its model to perform well on new data. In some embodiments, methods of the present disclosure are implemented on a computer platform. In some embodiments, a cryptographic token is used as part of an iterative estimate evaluation and value allocation mechanism, in which overfitting is economically irrational. In some embodiments, a contributor node is associated with a decentralized autonomous organization ("DAO").

In some embodiments, a host system administers and facilitates a machine learning competition, for example at a recurring frequency (e.g., hourly, daily, weekly, monthly, etc.), between participant computer devices (DSCNs). Participant DSCNs that are determined by the host system to have exhibited the highest performance can be rewarded. For example, the host system may allocate currency (e.g., cryptocurrency) and/or a cryptographic token to the higher-performing DSCNs, as selected by the host system. The allocation of a reward to a DSCN can comprise augmenting a balance, associated with the selected DSCN(s), by a predetermined value amount. The machine learning competition can include multiple "rounds" during which: (1) training data can be requested and/or downloaded from the host system by the DSCNs, (2) DSCNs generate one or more models based on the training data; (3) DSCNs submit data submissions ("estimates") to the host system based on their associated one or models; and (4) DSCNs submit "stakes" (or "perform staking") to the host system, where the stakes are associated with the estimates. For example, during staking, a DSCN can specify a crypto-token (e.g., Numeraire) amount for that DCSN's estimates. As used herein, an "estimate" provided by and/or collected from a DSCN can also be referred to as a "prediction," a "probability estimate," a "target probability estimate," an "estimates of a value of a target," or a probability of a target value (e.g., of a target value specified in a set of training data (also referred to herein as "first data")). In some implementations, a machine learning competition round has a duration of one week, and staking is permissible during a subset duration (e.g., only during the first two days of the round).

In some embodiments, during a machine learning competition, the host system analyzes or "tests" the estimate data submitted by the DSCNs (e.g., by treating the estimates as predictions, and comparing them with real-world outcomes, such as stock market performance and/or related variables), for example during an analysis period, to identify a subset of the submitted estimates as "successful." A successful estimate can have an accuracy, for example, of at least about 80% or at least about 90%. The analysis period can last, for example, for about one week, about two weeks, about three weeks, or about one month. Crypto-tokens staked on "successful" estimates can be returned to their associated DSCNs and, in addition, the DSCNs that provided the successful estimates can be rewarded through payment (e.g., of cryptocurrency or other currency or value). Crypto-tokens staked on "successful" estimates can be destroyed by the host system (e.g., the crypto-tokens can be marked as not usable, a transaction reflecting the destruction/burning/deletion of the crypto-tokens can be recorded on the blockchain, and/or the like). In some implementations, when a DSCN submits an estimate but does not submit a stake of crypto-tokens, that DSCN is not entitled to a reward if its estimate is successful. As used herein, an "estimate" can refer to a dataset including a large number of estimate values or prediction estimates.

In some embodiments, during a machine learning competition, a data file (e.g., a zip file) can be published at the beginning of the competition. The data file can include: (1) training data (e.g., a file, such as a comma-separated value file (".CSV file"), that includes features and their binary target values with which each DSCN can train its associated machine learning model(s)); (2) tournament data (e.g., a file, such as a .CSV file, that includes features and meta data that each DSCN can use to generate its own binary target estimates for submission, for example based on the training performed by that DSCN using the training data); (3) example models (e.g., example Python and R classifier scripts) that can be used by the DSCNs to produce submissions that are suitable for submission/upload to the host system as part of the competition (e.g., in .CSV form); and (4) example estimates (e.g., an example showing the format in which the estimates should be uploaded. The tournament data can be clean and/or regularized. In some implementations, the feature and target data of the training data and/or the tournament data is obfuscated. In other words, while the feature data (e.g., arranged in columns) contains information that is usable to predict the target data, the host system does not reveal the underlying variable associated with each of the features and targets. Each of the training data and the tournament data can include an era column that includes values corresponding to periods of time that may be unspecified from the DSCN's point of view. Each of the training data and the tournament data can include an "id" column that includes an identifier for each row of the data. Each of the training data and the tournament data can include a data type column that specifies whether a subset of the associated data (e.g., a row) is of a "train" type, a "validation/test" type, a "tournament" type, or a "live" type. Data of the "train" type can be used by a DSCN to train its machine learning model(s). Data of the "validation/test" type can be used by a DSCN for local training and/or testing of its model(s). Data of the "tournament" type does not include targets, and can be used by the host system for purposes of validating the model(s) of the participant DSCNs. Data of the "live" type can include new, live data for which no target data yet exists within the system. The analysis of DSCN estimate submissions by the host system, and/or the payout of rewards to participant DSCNs, can be based on the DSCNs' performance on the live data. In some embodiments, estimates submitted by DSCNs include "id" (i.e., row identifier) data and "probability" data (e.g., limited to the range "0 to 1").

In some implementations of a machine learning competition, if a DSCN makes multiple sequential estimate submissions to the host system during a single round, the most recent estimate submission received at the host system from that DSCN will replace any previous estimate submission(s). In some embodiments, when estimate submissions are uploaded to the host system by DSCNs, the estimate submissions are scored by the host system according to multiple metrics. The multiple metrics can include (1) logarithmic loss ("log loss"), which is a measure of a model's accuracy (e.g., as compared with live data, such as live market data); (2) consistency, defined herein as a percentage of eras in which a model achieves a logloss of $<-\ln(0.5)$; (3) originality, which measures whether the estimate submission is uncorrelated with estimates that were previously submitted; and (4) concordance, which measures whether estimates generated by the DSCN using the validation set, the test set, and the live set appear to have been generated by the same model at the DSCN. In some implementations, some or all of the aforementioned metrics can be published to a website by the host system, for public viewing, or otherwise made accessible to the participant DSCNs. In some implementations, a consistency threshold (e.g., 75%) is predetermined by the host system, such that estimate submissions having a consistency below 75% are excluded from the reward distribution phase of the competition by the host system. Alternatively or in addition, in some implementations, an estimate submission that fails to meet a predetermined level of concordance and/or a predetermined level of originality is excluded from the reward distribution phase of the competition by the host system.

Systems and methods of the present disclosure can leverage crowdsourced artificial intelligence from multiple contributing computer nodes (DSCNs), to achieve a "network effect" in that a synergistic improvement to the predictive power of a machine learning model (e.g., of a host system) can be realized. For example, the estimates collected from the multiple DSCNs as part of a machine learning competition (or a subset thereof) can be used by the host system to refine a knowledge base and/or algorithm thereof (e.g., autonomously, via machine learning, at the host system/ node), and/or to manage one or more assets (e.g., executing transactions involving, or making decisions relating to, a security). The knowledge base and/or algorithm can then be employed by the host system to predict a performance of a target system. As discussed above, in some embodiments, the DSCNs generate, and submit to the host system, estimates based on encrypted data downloaded from the host system, where the encrypted data does not include any information that is proprietary to the host system (e.g., data source(s), variable or feature name(s), etc.). In addition, in some embodiments, the estimates submitted by DSCNs do not include any information that is proprietary to the DSCNs (e.g., model(s), algorithm(s), etc.), thus ensuring reciprocal data security. In some embodiments, the encrypted data is made publicly available by the host system. Additionally, since systems and methods of the present disclosure discourage/disincentivize the submission of overfit data, for example through performance-based token augmentation or similar feedback mechanisms, estimates submitted by DSCNs can include reduced skew (i.e., can have a higher accuracy and/or usefulness), and an associated efficiency of estimate collection and synthesis performed by the host server can be improved.

As used herein, a "cryptographic token" is a digital representation of a utility, an asset, such as any fungible and/or tradeable asset (e.g., commodity points, loyalty points, cryptocurrencies such as bitcoin or altcoin, fiat money, etc.), a currency, an equity, a reputation value, and/or a reward value. Cryptographic tokens can be "minted" (i.e., generated, defined, created, or otherwise brought into existence) and, optionally, distributed to the public through an initial coin offering ("ICO"). Cryptographic tokens can be transacted (i.e., transferred between owners/possessors, for example in exchange for goods or services) on a blockchain, such that an immutable record of its provenance is created and can be tracked. In some cases, cryptographic tokens or cryptocurrency are generated upon solution of a cryptographic puzzle by one or more nodes on a blockchain network (further described below). An amount of cryptographic tokens or cryptocurrency that can be generated within a given timeframe can be limited by the complexity/difficulty of the cryptographic puzzle and/or the available processing power of the nodes of the blockchain network. Examples of cryptocurrencies include Ether ("ETH"), Litecoin ("LTC"), Bitcoin, Zcash ("ZEC"), Dash, Ripple ("XRP"), Monero ("XMR"), Cardano, NEM, Stellar, NEO, Internet of Things Application ("IOTA"), Numeraire ("NMR") and TRON. The use of a given cryptocurrency can be confined to an associated blockchain platform. For example, ETH is used on an Ethereum platform, and NMR is used on a Numerai platform. Some cryptocurrencies, such as Bitcoin, are digital forms of money used for making payments. Other cryptocurrencies, such as ETH, are digital commodities that can be used to purchase services within an associated platform (e.g., Ether can be used to purchase services within the Ethereum platform). In some embodiments, a customized cryptocurrency or cryptographic token (crypto-token) can be defined, distributed, and transacted as part of the development of a custom blockchain network and, optionally, confined to use therein.

As used herein, a "blockchain" refers to a continuously augmentable/growable list of immutable records, or "blocks," that is replicated and stored in a decentralized manner on each of a plurality of "nodes" that may be peer-to-peer ("P2P") networked. The collection of replicated records (e.g., stored in each of a plurality of databases of nodes of the blockchain network) can be referred to as a "distributed ledger." A "node" is a computing device (computer) that is connected to the blockchain network using a client that performs tasks such as validation (or confirmation, verification) and relaying of transactions and/or user (i.e., transaction requester) statuses. Blocks of a blockchain are linked to one another and cryptographically secured. For example, depending upon the implementation, each block of a blockchain can include one or more of a cryptographic hash of the immediately preceding block, a date/time stamp, and/or transaction data (or a reference thereto). Once a transaction is validated, the validating node can generate a new block representing the transaction and send the new block, for example from one node of the blockchain network to all other nodes in the blockchain network, for "recording" on the blockchain (i.e., storage, in an uneditable format, in a database of each node of the blockchain network). In some cases, each node joins the blockchain network voluntarily and can act as an administrator of the blockchain. Nodes can be incentivized to join a blockchain and participate in the transaction validation process using an incentive such as bitcoin or other cryptocurrencies or cryptotokens. For example, a method of validating a transaction (i.e., determining/confirming its authenticity, accuracy, etc.) can include the solving, by a node, of a computational or cryptologic puzzle (e.g., a mathematical or algorithmic problem). For example, a computational puzzle can include identifying a hash (e.g., a product of a cryptographic function) that connects a new block representing the transaction to a predecessor block of the blockchain. Such a task can be referred to as a "proof of work." The nodes of a blockchain network can be said to "compete" with one another by submitting solutions to the computational puzzle and, if successful (e.g., by a predetermined metric), can be assigned or "rewarded" the incentive. The competing of nodes for incentives can be referred to as "mining."

In some embodiments, a system executes an augmentation (e.g., an integer augmentation) to an account or other repository (e.g., a crypto-token repository) in response to a determination that a set of machine-learned data estimates has a predictive accuracy exceeding a predetermined threshold. The machine-learned data can be received at the system from multiple DSCNs. The DSCNs can interact with systems of the present disclosure as contributor, competitor and/or participant nodes in a machine learning competition or other collaborative computer modelling activity. Multiple augmentations to multiple associated repositories can be sequenced or "staged" according to a ranked staking order of multiple DSCNs. The ranked staking order can be established by the system in response to the receipt, at the system and from the multiple DSCNs, of a plurality of stake messages (e.g., including a single indication of a stake, or an indication of an N-dimensional compound stake). Estimate submissions (or "proffered" estimates) from each of the DSCNs that have been arranged in a ranked staking order can be dynamically filtered based on one or more of: an accuracy or scoring of the associated estimates, a DSCN ranking within the ranked staking order, and an available balance of a predefined resource (e.g., a "reward" balance, or a "prize pool" balance, also referred to herein as a predefined feedback resource"). The dynamic filtering can reduce the impact of historical data skew (e.g., model overfitting) on a model for forecasting or generating a predictive path for one or more assets.

In some implementations of the systems and methods set forth herein, asset trades can be identified, selected and/or executed by a host system (e.g., automatically), based at least in part on estimates that are crowd-sourced from DSCNs that have been given anonymized data. For example, machine learning systems of the present disclosure can be used to predict the value of an asset such as an equity (e.g., a hedge fund). A machine learning model can be based on one or more of the following: a machine-learned model, crowdsourced data sets (e.g., obtained by a host system from a plurality of DSCNs as part of a machine learning competition), crowdsourced machine-learned models, and/or historical data (i.e., "training data," or "first data").

Set forth below are more detailed descriptions of various concepts related to, and embodiments of, apparatuses and methods for cryptographic tokenization for coordinating machine intelligence and preventing overfitting. It should be appreciated that various concepts introduced above and discussed in greater detail below may be implemented in any of numerous ways, and the disclosed concepts are not limited to any particular manner of implementation. Examples of specific implementations and applications are provided primarily for illustrative purposes.

Training of Machine Learning Models and Overfitting

One approach to verifying accuracy in machine learning includes partitioning a dataset into a training set and a test set (or "holdout" set). Data of the test set may be referred to as "evaluation data." A trained model (i.e., a machine-learned model that has been developed based on data of the training set) can be tested for its predictive accuracy using the test set, which it has not previously seen. To maintain statistical validity, the test set should only be used once.

When a DSCN accesses the test set multiple times, and uses test set data as feedback for model development, the DSCN runs the risk of training a model that overfits the test set (i.e., "overtraining" of the model), thereby negatively impacting the model's ability to perform well on new data. A model that has been "overfit" to a particular set of data can incorporate erroneous data of that particular set of data to a disproportionate, and therefore undesirable, degree, such that while the model may perform well for that particular set of data (and data that is analogous thereto), it may not perform well when presented with different, "real" or "live" data. The overfit model can be said to have assigned too much "weight" to the particular set of data on which it was overtrained.

FIG. 1 illustrates an example of an overfitting curve in which the error ("$\xi$") associated with test data (represented by the lower curve) decreases as a number of data submissions from DSCNs increases, whereas, beyond an inflection point, the error ("$\xi$") associated with new data increases as the number of data submissions from DSCNs increases.

The overfitting problem described above can also be referred to as "adaptive data analysis," and models resulting from adaptive data analysis can range from slightly degraded to substantially useless, as described in Hardt, "Adaptive data analysis," accessible at http://blog.mrtz.org/2015/12/14/adaptive-data-analysis.html, and Hardt, "Competing in a data science contest without reading the data," accessible at http://blog.mrtz.org/2015/03/09/competition.html, the entireties of each of which are herein expressly incorporated by reference for all purposes. Adaptive data analysis can occur, for example, when a machine-learned model (e.g., "trained" by a DSCN) includes overfit historical data that impairs the live performance of the machine-learned model. In contrast with some known models, which rely on—and only demonstrate strong performance on—historical data, the platform-based systems and methods set forth herein utilize collections (or "pluralities") of models that can provide strong performance on new/"live" data.

A known approach to mitigating overfitting is to limit the amount of information about the test/holdout set that is exposed during reuse of the test/holdout set (see, e.g., Dwork, Feldman, Hardt, Pitassi, Reingold, and Roth, "Generalization in Adaptive Data Analysis and Holdout Reuse," accessible at http://papers.nips.cc/paper/5993-generalization-in-adaptive-data-analysis-and-holdout-reuse.pdf, the entirety of which is herein expressly incorporated by reference for all purposes). While perhaps sufficient for scientific discovery applications, this approach significantly detracts from the user experience, and can limit the rankings achievable by a participant in a machine learning tournament or similar application since model performance is theoretically limited by the limited extent to which data is available to the participant.

Staking of Estimates

Embodiments of the disclosure include a new machine learning system in which DSCNs can communicate degrees of confidence in the quality of their machine-learned models, as part of a machine learning competition process. For example, a DSCN may elect to compete in a new machine learning tournament by "staking" a crypto-token of the present disclosure on their submitted (or to-be-submitted) estimate. As used herein, a "stake" is a wager (e.g., having pecuniary or other type of value), bet, or interest that is "gambled" on the outcome of a competition. For example, a DSCN can submit a stake (e.g., a unit of cryptocurrency) based how well the DSCN expects its estimates to perform (i.e., how accurate the DSCN expects the estimates to be). If the DSCN's estimates are not sufficiently accurate (e.g., according to a predetermined threshold of accuracy or other metric), the host system may destroy or retain the stake (i.e., the DSCN surrenders its stake to the system), whereas if the DSCN's estimates are sufficiently accurate or "correct" (e.g., according to the predetermined threshold of accuracy or other metric), the DSCN may have its stake returned and/or receive a reward from the system (e.g., based on a "stake" or a "compound stake," discussed further below, where a compound stake includes both an indication of a stake and an indication of confidence). As such, in some embodiments, an iterative estimate evaluation and value allocation mechanism for resolving or reconciling stakes rewards DSCNs having the highest estimate accuracies (e.g., with an accuracy of greater than about 50%, or with a logloss of greater than about 0.69314). A stake associated with an estimate submission can be recorded and/or transacted on a blockchain. In some embodiments, the use of staking in machine learning competitions and/or other forms of collaborative modeling can result in improvement to the resulting machine-learned models as well as to the performance of a variety complex systems associated therewith. Embodiments of the present disclosure can be further understood, by way of illustrative example only, by considering a hedge fund as shown and described below, however other applications of the systems and methods of the present disclosure are also contemplated.

In some embodiments, a crypto-token can be an ERC20 Ethereum token, e.g., as detailed in Wood, "Ethereum: A Secure Decentralized Generalised Transaction Ledger," accessible at http://gavwood.com/paper.pdf, the entirety of which is herein expressly incorporated by reference for all purposes. In some embodiments, Ethereum tokens are represented and/or transacted by smart contracts that are executed on the Ethereum blockchain. Source code for an example crypto-token smart contract is provided below.

```
// Whoever creates the smart contract has the power to
   stop it; this person can be changed via transferOwner-
   ship(new_address)
contract Numeraire is Stoppable, Sharable {
string public standard="ERC20";
string public name="Numeraire";
string public symbol="NMR";
uint256 public decimals=18;
address public numerai=this;
// Cap the total supply and the weekly supply
uint256     public      supply_cap=21000000000-
   000000000000000;
uint256    public    disbursement_cap=96153846153-
   846153846153;
uint256 public disbursement_period=1 weeks;
uint256 public disbursement_end_time;
uint256 public disbursement;
uint256 public total_supply;
mapping (address=>uint256) public balance_of;
mapping (address=>mapping (address=>uint256)) public
   allowance_of;
mapping (address=>mapping (uint256=>uint256)) public
   staked;
// Generates a public event on the blockchain to notify
   clients
event Mint(address indexed recipient, uint256 value);
event Transfer(address indexed from, address indexed to,
   uint256 value);
event Approval(address indexed owner, address indexed
   spender, uint256 value);
```

```
event Stake(address indexed owner, uint256 indexed
    timestamp, uint256 value);
// Initialization
// Msg.sender is first owner
function Numeraire(address[]_owners, uint256_num_
    required, uint256_initial_disbursement)
    Sharable(_owners, _num_required){
    total_supply=0;
    // The first disbursement period begins at contract
        initialization,
    // and may be larger than the weekly disbursement cap.
    if (!safeToAdd(block.timestamp, disbursement_pe-
        riod)) throw;
    disbursement_end_time=block.timestamp+disburse-
        ment_period;
    disbursement=_initial_disbursement;
}
// Mint
// Can mint multiple times a week, up to the cap for the
    week; the cap restarts at the following week
// When minting 500 units to a user (i.e., the value used
    here is 500), 500 units are assigned to that user and 500
    units are assigned to the platform, so if you want to
    mint the cap you'll need to use cap/2 as the value or 25
    k [because an additional 25 k go to platform itself]
function mint(address_to, uint256_value) onlymanyown-
    ers(sha3(msg.data)) returns (bool ok) {
    // Recipient is not the platform
    if (isOwner(_to) ||_to==platform) throw;
    // Prevent overflows.
    if (!safeToAdd(balance_of[_to], _value)) throw;
    if (!safeToAdd(balance_of[numeral], _value)) throw;
    if (!safeToMultiply(_value, 2)) throw;
    if (!safeToAdd(total_supply, _value*2)) throw;
    if (!safeToSubtract(disbursement, _value*2)) throw;
    // Prevent minting more than the supply cap.
    if ((total_supply+(_value*2))>supply_cap) throw;
    // Replenish disbursement a maximum of once per
        week.
    if (block.timestamp>disbursement_end_time){
        disbursement_end_time=block.timestamp+disburse-
            ment_period;
        disbursement=disbursement_cap;
    }
    // Prevent minting more than the disbursement.
    if ((_value*2)>disbursement) throw;
    // The platform receives an amount equal to winner's
        amount.
    disbursement -=_value*2;
    balance_of[_to]+=_value;
    balance_of[platform]+=_value;
    total_supply+=_value*2;
    // Notify anyone listening.
    Mint(_to, _value);
    return true;
}
// Release staked tokens if the user's predictions were
    successful.
// _to is the address of the user whose stake is being
    released
function releaseStake(address _to, uint256 timestamp)
    onlymanyowners(sha3(msg.data)) returns (bool ok){
    var stake=staked[_to][timestamp];
    if(stake==0) {
        throw;
    }
    if (!safeToSubtract(staked[_to][timestamp], stake))
        throw;
    if (!safeToAdd(balance_of[_to], stake)) throw;
    staked[_to][timestamp]-=stake;
    balance_of[_to]+=stake;
    return true;
}
// Destroy staked tokens if the user's estimates were not
    successful.
// _to is the address of the user whose stake is being
    destroyed
function destroyStake(address _to, uint256 timestamp)
    onlymanyowners(sha3(msg.data)) returns (bool ok){
    var stake=staked[_to][timestamp];
    if(stake==0){
        throw;
    }
    // Reduce the total supply by the staked amount and
        destroy the stake.
    if (!safeToSubtract(total_supply, staked[_to][time-
        stamp])) throw;
    total_supply -=staked[_to][timestamp];
    staked[_to][timestamp] =0;
    return true;
}
// Stake NMR
function stake(address stake_owner, uint256_value) only-
    manyowners(sha3(msg.data)) returns (bool ok){
    // Platform cannot stake on itself
    if (isOwner(stake_owner) II stake_owner==numeral)
        throw;
    // Check for sufficient funds.
    if (balance_of[stake_owner]<_value) throw;
    // Prevent overflows.
    if (staked[stake_owner][block.timestamp] +_value
        <staked[stake_owner][block.timestamp]) throw;
    if (!safeToAdd(staked[stake_owner][block.time-
        stamp], _value)) throw;
    if (!safeToSubtract(balance_of[stake_owner], _value))
        throw;
    balance_of[stake_owner]-=_value;
    staked[stake_owner][block.timestamp] +=_value;
    // Notify anyone listening.
    Stake(stake_owner, block.timestamp, _value);
    return true;
}
// Send
function transfer(address _to, uint256_value) stopinE-
    mergency returns (bool ok){
    // Check for sufficient funds.
    if (balance_of[msg.sender]<_value) throw;
    // Prevent overflows.
    if (balance_of[_to]+_value<balance_of[_to]) throw;
    if (!safeToAdd(balance_[_to], _value)) throw;
    if (!safeToSubtract(balance_of[msg.sender], _value))
        throw;
    balance_of[msg.sender]-=_value;
    balance_of[_to]+=_value;
    // Notify anyone listening.
    Transfer(msg.sender, _to, _value);
    return true;
}
```

```
// for transferring nmr from numerai account using mul-
    tisig
function numeraiTransfer(address _to, uint256 _value)
    onlymanyowners(sha3(msg.data)) returns(bool ok){
    // Check for sufficient funds.
    if (balance_of[numerai]<_value) throw;
    // Prevent overflows.
    if (!safeToAdd(balance_[_to], _value)) throw;
    if (!safeToSubtract(balance_of[numerai], _value))
        throw;
    balance_of[numerai] -=_value;
    balance_of[_to]+=_value;
    // Notify anyone listening.
    Transfer(numerai, _to, _value);
    return true;
}
// Allow other contracts to spend on sender's behalf
function approve(address _spender, uint256 _value)
    stopinEmergency returns (bool ok){
    allowance_of[msg.sender][_spender]=_value;
    Approval(msg.sender, _spender, _value);
    return true;
}
// Send from a contract
function transferFrom(address _from, address _to,
    uint256 _value) stopinEmergency returns (bool ok){
    // Check for sufficient funds.
    if (balance_of[_from]<_value) throw;
    // Prevent overflows.
    if (!safeToAdd(balance_[_to], _value)) throw;
    // Check for authorization to spend.
    if (allowance_of[_from][msg.sender]<_value) throw;
    if (!safeToSubtract(balance_of[_from], _value)) throw;
    if (!safeToSubtract(allowance_of[_from][msg.
        sender], _value)) throw;
    balance_of[_from]-=_value;
    allowance_of[_from][msg.sender]-=_value;
    balance_of[_to]+=_value;
    // Notify anyone listening.
    Transfer(_from, _to, _value);
    return true;
}
// ERC20 interface to read total supply
function totalSupply()constant returns (uint256 _supply) {
    return total_supply;
}
// ERC20 interface to read balance
function balanceOf(address _owner) constant returns
    (uint256 _balance) {
    return balance_of[_owner];
}
// ERC20 interface to read allowance
function allowance(address _owner, address _spender)
    constant returns (uint256 _allowance) {
    return allowance_of[_owner][_spender];
}
// Lookup stake using the owner's address and time of the
    stake.
function stakeOf(address _owner, uint256 _timestamp)
    constant returns (uint256 _staked) {
    return staked[_owner][_timestamp];
}
// Check if it is safe to add two numbers
function safeToAdd(uint a, uint b) internal returns (bool)
    {
    uint c=a+b;
    return (c>=a && c>=b);
}
// Check if it is safe to subtract two numbers
function safeToSubtract(uint a, uint b) internal returns
    (bool) {
    return (b <=a && a-b <=a);
}
function safeToMultiply(uint a, uint b) internal returns
    (bool) {
    uint c=a*b;
    return(a ==0 ||(c/a)==b);
}
// prevents accidental sending of ether
function ( ){
    throw;
    }
}
```

In some embodiments, minted crypto-tokens are sent to a platform. A smart contract (e.g., an Ethereum smart contract) can specify a maximum number of crypto-tokens that can be minted (e.g., 21 million crypto-tokens or units). The platform can send a specified or predetermined number of crypto-tokens (e.g., 1 million crypto-tokens or units) to one or more recipients based on specified criteria, e.g., to DSCNs based on their historical ranking on a platform leaderboard. In some implementations, after an initial distribution, the smart contract mints a fixed number of crypto-tokens during each of a plurality of predetermined time periods (e.g., each week) until the maximum number of crypto-tokens is reached. DSCNs can therefore earn crypto-tokens on an ongoing basis, according to their performance (e.g., accuracy of estimates) in machine learning competitions.

In some embodiments, when participating in a machine learning competition, each participating DSCN receives (e.g., downloads) a first data set (or "training data") from a system hosting the machine learning competition ("host system"), where the host system can include one or more computing devices each including a processor and a memory operably coupled thereto. The first data set can include substantially or exclusively numerical data, and the same first data set can be sent to or accessible to each of the participant DSCNs. The first data can have a row and column structure, for example including an identifier ("id") column, multiple columns representing "features," and a column representing an "outcome" or "target" for the associated row. In some embodiments, values in the target column can range from 0 to 1, and in turn, estimates based on the first data and received from the participant DSCNs can also include values from 0 to 1. A number of features included in the first data set can be, for example, about 14, about 17, about 21, about 25, about 35, about 50, or about 75, or about 100, or about 250, or about 500, or from about 10 to about 50, or from about 100 to about 150, or from about 250 to about 500. The first data can be a dataset associated with any of a variety of parameters, such as a trading value of a financial instrument (e.g., a hedge fund, a stock, etc.), medical data, weather patterns, etc., as discussed further below.

In some embodiments, when the first data is associated with a financial instrument, the first data can include multiple data records each including a single "id" value, a single "target" data value and a plurality of "feature" data values, where features associated with the feature values can include one or more of: a stock ticker symbol, price-to-earnings ratio ("PIE ratio"), price/earnings to growth ratio ("PEG" ratio), price-to-book ratio ("P/B ratio"), debt-equity ratio, free cash flow ("FCF"), momentum (e.g., as a %), earnings per share ("EPS"), and/or the like. Each of the feature data values can represent or be associated with any individual of the foregoing features, or any combination of the foregoing and/or modification(s) thereof. For a given row or other subdivision of the first data, an associated "id" value can be associated with a company or a financial instrument. Also, for a given row or other subdivision of the first data, the target data value can be associated with an outcome, result, condition, property, performance measure, or attribute associated with the feature values occupying the same row or other subdivision of that first data. When the first data is associated with a financial instrument, the target data value can be associated with one or more of: a "beat the market" value (e.g., 0=no, 1=yes), an indication of price increase or decrease, an indication of a buy or sell event, an indication of a buy or sell recommendation, an indication of a price of a financial instrument, an indication of a favorability of taking a long position, an indication of a favorability of taking a short position, an indication of a projected time until achieving an increase or decrease of a price or other metric by a predetermined factor, an indication of a holding time, an indication of a financial metric (e.g., P/E ratio, PEG ratio, P/B ratio, FCF, momentum, EPS, etc.) at a predetermined date/time (e.g., in the future), and/or the like.

In some embodiments, when the first data is associated with medical data, the first data can include multiple data records each including a single "id" value, a single "target" data value and a plurality of "feature" data values, where features associated with the feature values can include one or more of: natural biomarkers (e.g., pharmacodynamic (PD) biomarkers), artificially-introduced biomarkers (e.g., imaging biomarkers), blood pressure, cholesterol (e.g., serum LDL), P53 gene, matrix metalloproteinases (MMPs), deoxyribonucleic acid (DNA), white blood cell count, red blood cell count, C-reactive protein ("CRP") level, a presence of an isotopic label/marker, an antibody level, a biological cell (e.g., cell color or size), and/or the like. Each of the feature data values can represent or be associated with any individual of the foregoing features, or any combination of the foregoing and/or modification(s) thereof. For a given row or other subdivision of the first data, an associated "id" value can be associated with a patient or a sample. Also, for a given row or other subdivision of the first data, the target data value can be associated with an outcome, result, condition, property, performance measure, or attribute associated with the feature values occupying the same row or other subdivision of that first data. When the first data is associated with medical data, the target data value can be associated with one or more of: an indication of a medical outcome (e.g., cancer or no cancer, malignancy of a tumor or mass, etc.), an indication of a predisposition to (or a risk of, or probability of) a medical malady, an indication of pharmacological response, an indication of an efficacious medication dosage, an indication of whether a predetermined drug and/or dosage will be efficacious for a given patient, and/or the like.

In some embodiments, when the first data is associated with weather, the first data can include multiple data records each including a single "id" value, a single "target" data value and a plurality of "feature" data values, where features associated with the feature values can include indications of one or more of: global positioning system ("GPS") location data, atmospheric pressure, atmospheric density, air temperature, humidity, precipitation, cloud cover, wind speed, wind direction, and/or the like. Each of the feature data values can represent or be associated with any individual of the foregoing features, or any combination of the foregoing and/or modification(s) thereof. For a given row or other subdivision of the first data, an associated "id" value can be associated with a geographic (e.g., GPS) location or region. Also, for a given row or other subdivision of the first data, the target data value can be associated with an outcome, result, condition, property, performance measure, or attribute associated with the feature values occupying the same row or other subdivision of that first data. When the first data is associated with medical data, the target data value can be associated with one or more of: a meteorological forecast (e.g., an indicator of whether it will rain, snow, or hail), and/or the like.

Importantly, the first data set can have a "genericized" or "abstractified" form, in that it can exclude information that is proprietary to the host system. For example, one or more "obfuscation" techniques can be applied to proprietary data, so as to transform the proprietary data into the first data in such a manner that the proprietary data cannot be identified or "reverse engineered" by a recipient of the first data. An example obfuscation technique is random projection, which obfuscates the proprietary data while preserving the predictive structure of the proprietary data (e.g., the distances between values of the proprietary data), such that machine learning is still possible. The first data set can also be encrypted, such that one or more original variables or attributes from which the first data set was derived is not identifiable or decipherable by the DSCN(s). For example, the first data set can be generated, at the host system, using a method such as homomorphic encryption ("HE"), zero-knowledge proofs ("ZKP"s), and/or a similar method. Examples of HE include, but are not limited to, CryptDB, additively homomorphic encryption, partially homomorphic cryptosystems (such as unpadded Rivest-Shamir-Adleman ("unpadded RSA"), ElGamal, Goldwasser-Micali, Benaloh, or Paillier), fully homomorphic encryption (e.g., Gentry's cryptosystem, or cryptosystem over the integers), etc. Examples of ZKPs include, but are not limited to, zero-knowledge Succinct Non-Interactive Arguments of Knowledge ("zk-SNARK"), etc. The DSCN's can process the received first data to generate estimates (e.g., estimates of outcomes or targets, where each of the estimates has a value ranging from 0 to 1), for example by building associated machine learning algorithms based on the first data. The generation of estimates at each DSCN can be performed in a different way (i.e., in a manner specific to that DSCN), as determined by that DSCN. For example, each DSCN can process the first data according to the data types embedded therewithin (e.g., according to whether the data type specified for each row/record is "train," validation/test," "tournament," or "live"). Alternatively or in addition, each DSCN take its own approach to subdividing the first data into a "training set" of data for training a machine learning model, a "testing set" that the DSCN uses to test its trained model, and a "validation set" that the DSCN uses to refine/finalize its model. Each of the foregoing steps can be performed iteratively by the associated DSCN, e.g., for a predetermined or dynamically determined number of iterations, and/or based on different subdivisions or partitions of the first data, at the DSCN's choosing.

When DSCNs are sufficiently confident about their estimates, they can make blockchain transactions to send (or "stake") crypto-tokens to a smart contract address on a blockchain (e.g., Ethereum) (e.g., as part of a machine learning competition). The host system may identify the stakes sent by the DSCNs by viewing, querying, or otherwise interacting with the blockchain. The crypto-tokens can be retained (still assigned to/associated with the DSCNs), for example in a smart contract, for a holding period t, where t is sufficiently large to judge performance of the DSCNs' model(s) on new data. In some cases, during the holding period t, the crypto-tokens cannot be transferred or otherwise transacted, thereby ensuring the integrity of the machine learning competition. Before or after the DSCNs submit their stakes, the DSCNs upload or otherwise submit their estimates to the host system for analysis. In some cases, the DSCNs submit their estimates without including any information about the algorithm(s) or model(s) used to generate the estimates. The host system analysis can include a determination of the accuracy of the estimates (e.g., based on actual outcomes that resulted from the first data or a proxy of the first data, where the actual outcomes are known to the host system but not to the DSCNs). After t has elapsed, the platform determined how well each of the DSCNs' estimates performed as compared with the "correct"/actual outcome data (and, optionally, sends a message to the smart contract with the performance information). Those DSCNs having the most accurate estimates may "earn," and be awarded, dollars or other value via an iterative estimate evaluation and value allocation mechanism, and their staked crypto-tokens may be returned to them. By contrast, crypto-tokens associated with those DSCNs having the least accurate estimates can be destroyed. For example, an event in which the crypto-tokens associated with the under-performing DSCNs are irreversibly destroyed can be recorded on (and publicly verifiable via) the Ethereum blockchain.

Iterative Estimate Evaluation and Value Allocation

As discussed above, some embodiments of the present disclosure include an iterative estimate evaluation and value allocation mechanism. An overview of an example iterative estimate evaluation and value allocation process is provided below.

In some embodiments, a predefined resource is generated as part of a machine learning competition/tournament administered by a host system in network communication with a plurality of DSCNs. The predefined resource can include, for example, a fixed value of crypto-tokens, fiat money (e.g., dollars), cryptocurrency, or any other value increment. A predefined resource can also be referred to as a "predefined divisible resource ("PDR"), a "total payout," or a "prize pool." In some embodiments, the predefined resource can be an independently predetermined amount of fiat money, representative money, cryptocurrency, crypto-tokens, financial instrument value (e.g., stock), tangible asset vouchers and/or service vouchers (e.g., cellular data and/or minutes, consulting services, legal services, medical services (e.g., flu shots), etc.). In other embodiments, the predefined resource can be based on the received indications of stake and/or confidence from the plurality of DSCNs (e.g., a sum or other algebraic manipulation thereof). An iterative estimate evaluation and value allocation mechanism or component can allocate the prize pool among multiple recipients, such as DSCNs. DSCNs can submit bids to the system. Bids are tuples (C, s), where "C" is confidence defined as the number of crypto-tokens the DSCN is willing to stake to win 1 dollar, and "S" is the amount of crypto-tokens being staked. In some cases, the tuple including both confidence and stake are collectively referred to as a "compound stake." For a given/predetermined time period "t," S is locked in an associated Ethereum contract, and is inaccessible to anyone, including the platform. After t has elapsed, an iterative estimate evaluation and value allocation can be used to determine the payouts. In some embodiments, the iterative estimate evaluation and value allocation mechanism is a variant of a multiunit Dutch auction (i.e., a multiunit Dutch auction with additional rules/parameters).

Performance associated with each DSCN (and, correspondingly, the performance of the DSCN's data modeling, as reflected in their estimate submissions) is evaluated after time t. The performance evaluation metric can be logarithmic loss ("logloss"). Logarithmic loss measures the performance of an estimate where the estimate value (e.g., modelling a target) is a probability value between 0 and 1. In some embodiments using logloss as an evaluative metric, each observation can be in one associated class, and a predicted probability for each class can be submitted. The metric is negative the log likelihood of the model that says each test observation is chosen independently from a distribution that places the submitted probability mass on the corresponding class, for each observation, as shown by:

$$logloss = -\frac{1}{N}\sum_{i=1}^{N}\sum_{j=1}^{M}y_{i,j}\log(p_{i,j})$$

where N is the number of observations, M is the number of class labels, log is the natural logarithm, $y_{i,j}$ is 1 if observation i is in class j and 0 otherwise, and $p_{i,j}$ is the predicted probability that observation i is in class j.

Both the solution file and the submission file generated as a result of the logloss analysis can be comma-separated value files (CSV's) in which each row corresponds to one observation, and each column corresponds to one class. The solution file includes 1's and 0's (exactly one "1" in each row), while the submission includes predicted probabilities or estimates.

In some embodiments, the submitted probabilities or estimates need not initially sum to 1, since they can be rescaled (e.g., each is divided by the sum) such that they sum to 1 prior to evaluation. In some embodiments, actual submitted predicted probabilities or estimates can be replaced with $\max(\min(p, 1-10^{\{-15\}}), 10^{\{-15\}})$. An example php snippet is provided below.

id,col1,col2,Indicator
1,1,0, Public
2,1,0, Public
3,1,0, Public
4,0,1, Public
5,0,1, Public
6,0,1, Public
7,1,0, Private
id,col1,col2
1,0.5,0.5
2,0.1,0.9
3,0.01,0.99
4,0.9,0.1
5,0.75,0.25
6,0.001,0.999
7,1,0
AssertAreEqual(1.881797068998267, actual: publicScore, delta: ErrorTolerance);

The above example 'publicScore' is the score for only the rows marked as 'Public'. The observation with ID of 7 and values "1,0" is ignored in the calculation of 1.881797068998267, and N=6.

Logloss can be a suitable metric for binary classification problems, such as the example platform-based machine learning competition discussed above. In such an implementation, an estimate can be considered to have performed well if logloss<−ln(0.5), and an estimate can be considered to have performed poorly if logloss ≥−ln(0.5). The DSCNs can be ranked in descending order of confidence C. In descending order of confidence, and until the prize pool is depleted, DSCNs are awarded S/C dollars if their estimates performed well, or they lose stake S if their estimates performed poorly. Once the prize pool is depleted, DSCNs no longer earn dollars or lose their stakes. An example is shown and illustrated in the table below.

TABLE 1

Example Prize Pool Depletion

| Confidence C | Stake S | S/C | Logloss < −ln(0.5) | DSCN |
|---|---|---|---|---|
| 5 | 10000 | 2000 | NO | J |
| 4 | 2000 | 500 | YES | T |
| 1.5 | 3000 | 2000 | YES | M |
| 1 | 5000 | 5000 | NO | T |
| 0.5 | 300 | 600 | YES | S |

As shown in Table 1, DSCNs contributing to a machine learning competition are ranked in descending order according to their associated confidence levels with their estimates (i.e., DSCN "J," with a confidence C of 5, followed by DSCN "T," with C=4, followed by DSCN "M," with C=1.5, followed by DSCN "T," with C=1, followed by DSCN "S," with C=0.5). In response to a determination that the estimates provided by J did not achieve logloss <−ln(0.5), J's 10,000 staked crypto-tokens are destroyed, and J is not awarded any portion of the prize pool. In response to a determination that the estimates provided by T did achieve logloss <−ln(0.5), T receives (i.e., is assigned) $500 and T's staked crypto-tokens are returned. In response to a determination that the estimates provided by M did achieve logloss<−ln(0.5), M receives $2,000 and M's staked crypto-tokens are returned. In response to a determination that the estimates provided by T did not achieve logloss <−ln(0.5), T's crypto-tokens are destroyed. In response to a determination that the estimates provided by S did achieve logloss<−ln(0.5), S receives $500, which is $100 less than S's stake/bid, because the prize pool is exhausted. Any additional DSCNs listed below S (i.e., having lower confidence numbers) will have their staked crypto-tokens returned to them, and will receive zero dollars.

Below is an example analysis of staking, according to some embodiments of the disclosure. The variable "p" represents the probability that an estimate will achieve logloss <−ln(0.5) when it processes "new" data that was previously "unseen" (i.e., not processed) by the model. A low value of p can imply a high probability that a model is overfit. The variable "S" represents a total value of crypto-tokens staked by a DSCN associated with the model. The variable "e" represents an exchange rate, in crypto-tokens per dollar. As above, the variable "C" represents confidence. A DSCN can be expected to stake crypto-tokens if an expected value of staking the crypto-tokens is a positive value. If a DSCN stakes S and achieves logloss ≥−ln(0.5), the DSCN loses s/e dollars. If the DSCN stakes S and achieves logloss <−ln(0.5), the DSCN wins S/C dollars. Therefore, the expected value in dollars of staking S with confidence C is $$E(c, s) = p\frac{s}{c} - (1-p)\frac{s}{e}$$

A DSCN will stake if $$E(c, s) \geq 0$$

$$p\frac{s}{c} - (1-p)\frac{s}{e} \geq 0$$

This implies $$p \geq \frac{c}{c+e}$$

In some embodiments, DSCNs submit indications of stakes to the system without submitting separate indications of confidence. In other words, the indications of stakes may be said to be proxy indications of confidence. The ranking of the DSCNs and/or the distribution of the prize pool among participants can then be based on the indications of stakes alone.

When staking is used in connection with the submission of estimates as part of a machine learning competition (or other collaborative computer modelling activity), a "self-revelation" results. Stated another way, DSCNs are incentivized to participate in a machine learning competition (or other collaborative modelling activity) if they have a high confidence in their model(s) (and, hence, expect a positive value to be associated with the staking), but are not incentivized to participate if they have a low confidence in their model(s) (and, relatedly, expect a non-positive value to be associated with the staking). Since overbidding and underbidding are both non-optimal behaviors, bidding behaviors within the systems (and according to the methods) set forth herein can more accurately reflect p, to an increasing degree over time as the systems and methods set forth herein are more widely implemented, and the accuracy of estimating p may increase with time. Moreover, since higher confidences can produce greater incentives for participation in an iterative estimate evaluation and value allocation, systems and methods set forth herein can provide the following benefits:

The higher the p, the higher C a DSCN will submit, and the more dollars the DSCN can win from the iterative estimate evaluation and value allocation.

For a fixed p, a confidence that is too high produces E(c,s)<0, which will deter participation.

Models that perform well on historical data but fail to generalize (and, therefore, have a low p) will either have logloss <−ln(0.5) or have E(c,s) <0.

Because crypto-tokens can be used by DSCNs to earn dollars, the exchange rate e>o.

Crypto-tokens can have a higher value to DSCNs with large p because they can use them to earn dollars with higher confidence.

A DSCN with p=1 has an expected value in dollars $$E(c, s) = \frac{s}{c}.$$

To this DSCN, the value of all crypto-tokens can be the net present value of all future stake payouts from the platform.

In some embodiments, the iterative estimate evaluation and value allocation is designed to prioritize the accuracy of estimates over the number/amount of crypto-tokens staked. In other words, the iterative estimate evaluation and value allocation need not be revenue maximizing, but incentivizing the contribution of superior-accuracy models ("self-revelation") can be important. Although a weakly dominant strategy in second-price auctions is to bid truthfully, second-price auctions can be more susceptible to collusion, whereas first-price auctions are less susceptible to collusion. Accordingly, in some embodiments, a first-price auction such as a Dutch auction can be utilized, rather than an Ausubel auction or the like.

Figure 2:
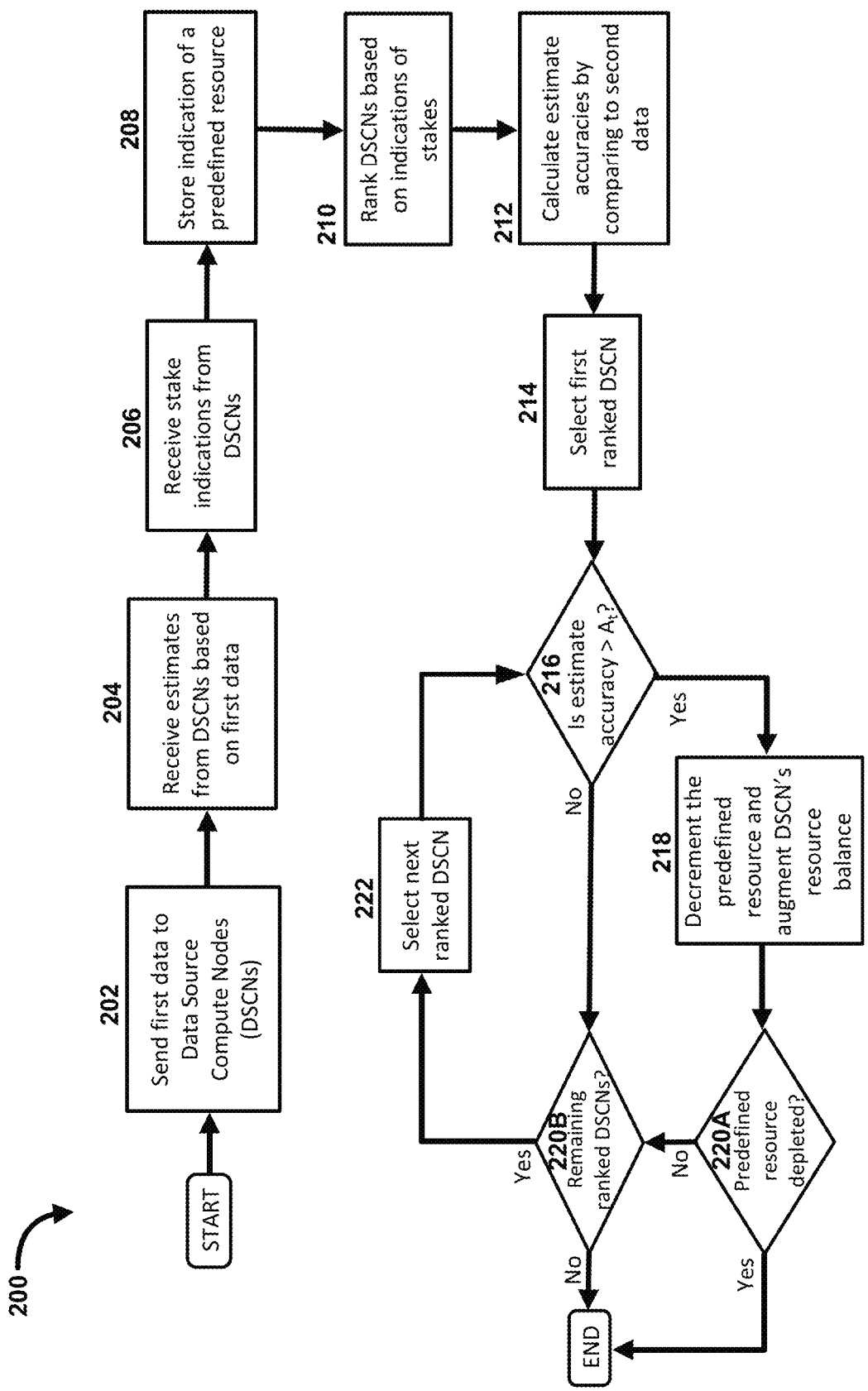
FIG. 2 is a flow diagram showing a process for data source node compute device staking and estimate submission, according to some embodiments.

FIG. 2 is a flow diagram showing a system-implemented process/method for data source node compute device staking and estimate submission, according to some embodiments.

As shown in FIG. 2, a process 200 includes sending, at 202, first data from a host system to each data source compute node (DSCN) of a plurality of DSCNs (e.g., in response to a download request received from the DSCNs). At 204, a plurality of different estimates (e.g., predictions or estimates of target values, arranged in data sets) based on the first data are received at the host system from each DSCN of the plurality of DSCNs, for example after a predetermined period of time (e.g., about 1 week). At 206, indications of stake (and, optionally, a separate indicator of confidence— not shown) are received at the host system from the DSCNs. At 208, an indication of a predefined resource is stored in memory (e.g., stored a memory of the host system and/or recorded to a blockchain). Although shown in FIG. 2 to occur before the indications of stake at 206, the sending of first data to each DSCN can instead occur after the indication of stake, depending upon the implementation. As discussed above, the first data can have a row and column structure, for example including columns representing "features" and a column representing an "outcome" (or "target") for the associated row. A number of features included in the first data set can be, for example, about 14, about 17, about 21, about 25, or about 50. As such, the first data set can be referred to as N-dimensional data (e.g., 14-D, 17-D, 21-D or 25-D data). An example first data set excerpt appears as follows:

| id | era | data_type | feature1 | feature2 | ... | feature16 | feature17 | feature18 | feature19 | feature20 | feature21 | target |
|---|---|---|---|---|---|---|---|---|---|---|---|---|
| 90616 | era97 | validation | 0.49329 | 0.50315 | | 0.35257 | 0.6135 | 0.6633 | 0.6241 | 0.51829 | 0.49377 | 1 |
| 148473 | era97 | validation | 0.48536 | 0.60496 | | 0.41593 | 0.55385 | 0.57093 | 0.50058 | 0.46647 | 0.37004 | 1 |
| 72743 | era97 | validation | 0.55576 | 0.45497 | | 0.45411 | 0.54581 | 0.61678 | 0.47875 | 0.5892 | 0.55222 | 0 |
| 32457 | era97 | validation | 0.55854 | 0.6082 | | 0.52813 | 0.45648 | 0.45726 | 0.38095 | 0.46737 | 0.3828 | 0 |
| 12608 | era97 | validation | 0.47596 | 0.61351 | | 0.42418 | 0.55395 | 0.55924 | 0.48082 | 0.45072 | 0.34582 | 1 |
| 80166 | era97 | validation | 0.51449 | 0.71322 | | 0.43549 | 0.51764 | 0.53924 | 0.58193 | 0.36316 | 0.27366 | 0 |
| 138721 | era97 | validation | 0.54508 | 0.39557 | | 0.35765 | 0.61912 | 0.69269 | 0.67454 | 0.56747 | 0.62421 | 0 |
| 30657 | era97 | validation | 0.46923 | 0.63229 | | 0.39984 | 0.56781 | 0.58909 | 0.52032 | 0.46256 | 0.36554 | 0 |
| 52519 | era97 | validation | 0.48766 | 0.50066 | | 0.39116 | 0.60292 | 0.64944 | 0.52039 | 0.55073 | 0.51269 | 1 |
| 25566 | era97 | validation | 0.4746 | 0.5769 | | 0.41504 | 0.56169 | 0.5694 | 0.47003 | 0.46783 | 0.35187 | 0 |
| 151320 | era97 | validation | 0.23882 | 0.29298 | | 0.14936 | 0.86498 | 0.90049 | 0.4586 | 0.78824 | 0.66398 | 1 |
| 117299 | era97 | validstion | 0.59988 | 0.67737 | | 0.50896 | 0.43573 | 0.44627 | 0.55747 | 0.34685 | 0.28754 | 0 |
| 142496 | era97 | validation | 0.69747 | 0.73308 | | 0.60436 | 0.35135 | 0.37525 | 0.59726 | 0.2479 | 0.2315 | 1 |
| 119329 | era97 | validation | 0.497 | 0.46613 | | 0.32341 | 0.64791 | 0.72357 | 0.69207 | 0.54145 | 0.55821 | 1 |
| 64871 | era97 | validation | 0.4576 | 0.33564 | | 0.34824 | 0.67337 | 0.72957 | 0.47735 | 0.68195 | 0.67278 | 1 |
| 20889 | era97 | validation | 0.51169 | 0.61478 | | 0.43875 | 0.52545 | 0.54429 | 0.50107 | 0.45811 | 0.36763 | 0 |
| 60782 | era97 | validation | 0.64905 | 0.50556 | | 0.54834 | 0.45682 | 0.51441 | 0.49647 | 0.48017 | 0.50258 | 0 |

As shown in the example excerpt above, the first data set can include an identifier column ("id"), an era column ("era"), a data type column ("data_type"), multiple feature columns, and a target/output column. "Era" is an attribute that represents an increment of time and allows for the measurement of consistency. Each first data set can include subsets of data, where each subset of data (e.g., including 6,000 records or rows) is associated with an era. The evaluation of the predictive data received by a host system can be performed, at least in part, based on eras. For example, the host system can determine how many eras have associated predictive accuracies that are greater than a predetermined threshold value.

The estimates provided to the host system by the DSCNs can represent outputs from machine learning models associated with each of the DSCNs. As such, the models or algorithms used by the DSCNs to generate the estimates can be referred to as "N-dimensional" models (e.g., 14-D, 17-D, 21-D or 25-D models) predicated on patterns detected in the first data set. Each DSCN is then ranked, at 210 (or at any time after indications of stakes are received from all participant DSCNs), based on the received indications of stakes (and/or, optionally, based on received indications of confidence—not shown), so as to generate a plurality of ranked DSCNs. An example excerpt from a set of estimates received from a DSCN (i.e., an estimate submission) appears as follows:

| id | probability | id | probability | id | probability | id | probability |
|---|---|---|---|---|---|---|---|
| 90616 | 0.49089 | 25224 | 0.49337 | 114541 | 0.53752 | 20357 | 0.49582 |
| 148473 | 0.52577 | 59356 | 0.52158 | 144016 | 0.48836 | 35040 | 0.49705 |

-continued

| id | probability | id | probability | id | probability | id | probability |
|---|---|---|---|---|---|---|---|
| 72743 | 0.47151 | 63272 | 0.496 | 87312 | 0.49659 | 114863 | 0.486 |
| 32457 | 0.52883 | 70444 | 0.50425 | 106561 | 0.52627 | 145183 | 0.48608 |
| 12608 | 0.48982 | 150992 | 0.49665 | 66838 | 0.50577 | 93560 | 0.45099 |
| 80166 | 0.48838 | 103716 | 0.51237 | 43350 | 0.53738 | 82057 | 0.51251 |
| 133721 | 0.5073 | 105249 | 0.53089 | 104542 | 0.4815 | 83819 | 0.54186 |
| 30657 | 0.51341 | 18548 | 0.52287 | 115346 | 0.51613 | 44422 | 0.52807 |
| 52519 | 0.54754 | 24348 | 0.52923 | 28156 | 0.48806 | 20056 | 0.49162 |
| 25566 | 0.51521 | 78926 | 0.53981 | 96836 | 0.48218 | 10160 | 0.5426 |
| 151320 | 0.53291 | 44086 | 0.52898 | 91939 | 0.47386 | 103453 | 0.53761 |
| 117299 | 0.48447 | 143403 | 0.53679 | 131747 | 0.52217 | 34485 | 0.54245 |

. . .

Continuing the example of FIG. 2, an accuracy of each received estimate is calculated, at 212 via a processor, by comparing the received estimates to second data. The accuracy can be calculated, for example, as a percentage difference between the estimates and the second data (e.g., estimate values divided by associated actual values of the second data). In such an implementation, a predefined accuracy threshold ($A_t$) may be about 0.99 (or about 99%), about 0.95 (or about 95%), about 0.9 (or about 90%), or about 0.85 (or about 85%), and/or the like. Alternatively, as discussed above, a Logloss metric can be used. In such cases (not shown in FIG. 2), the estimates may be considered to be accurate (i.e., to be sufficiently accurate to merit a reward) if logloss <-ln(0.5), and a model can be considered to have performed poorly if logloss -ln(0.5).

For a first ranked DSCN, selected at 214, the predefined resource is decremented and a resource balance augmentation (i.e., an award of a portion of the predefined resource) is assigned to the first ranked DSCN (at 218) if the accuracy of the estimate associated with the first ranked DSCN exceeds At at 216, and the process 200 proceeds to step 220A. If the accuracy of the estimate associated with the first ranked DSCN does not exceed At at 216, the process 200 proceeds to step 220B without decrementing or augmenting at 218. At 220A, the system determines whether the predefined resource has been depleted. If not, the process 200 proceeds to step 220B. If it is determined at 220A that the predefined resource has been depleted, the process 200 ends. At 220B, the system determines whether there are remaining ranked DSCNs whose estimates' accuracies have not yet been evaluated. If so, the process 200 proceeds to step 222, where a next ranked DSCN from the plurality of ranked DSCNs is selected, and a determination is again made, at 216, as to whether the estimate associated with that ranked DSCN exceeds $A_t$, and the process 200 proceeds as described above. If it is determined at 220B that there are no remaining ranked DSCNs, the process 200 ends.

Figure 3:
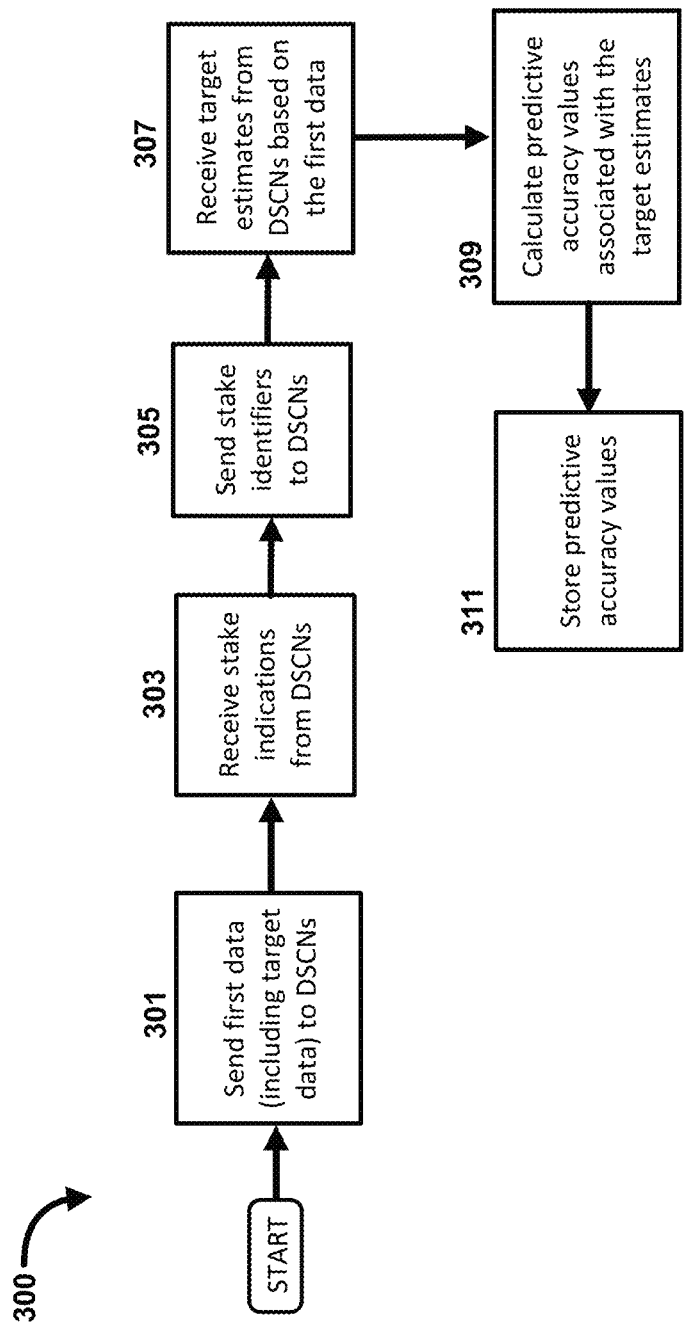
FIG. 3 is a flow diagram showing a process for data source node compute device staking and estimate submission, according to some embodiments.

FIG. 3 is a flow diagram showing a process for data source node compute device staking and estimate submission, according to some embodiments. As shown in FIG. 3, a method 300 includes sending, at 301, first data from a host node to each data source compute node of a plurality of data source compute nodes, the first data including target data. At 303, indications of stake are received at the host node from each data source compute node of the plurality of data source compute nodes. At 305, a stake identifier is sent to each data source compute node of the plurality of data source compute nodes in response to receiving the indications of stake. At 307, a target estimate based on the first data and associated with the target data is received at the host node from each data source compute node of the plurality of data source compute nodes. At 309, a predictive accuracy value associated with the target estimate is calculated at the host node and for each received target estimate, and at 311 the calculated predictive accuracy values associated with the target estimates are stored.

Figure 4:
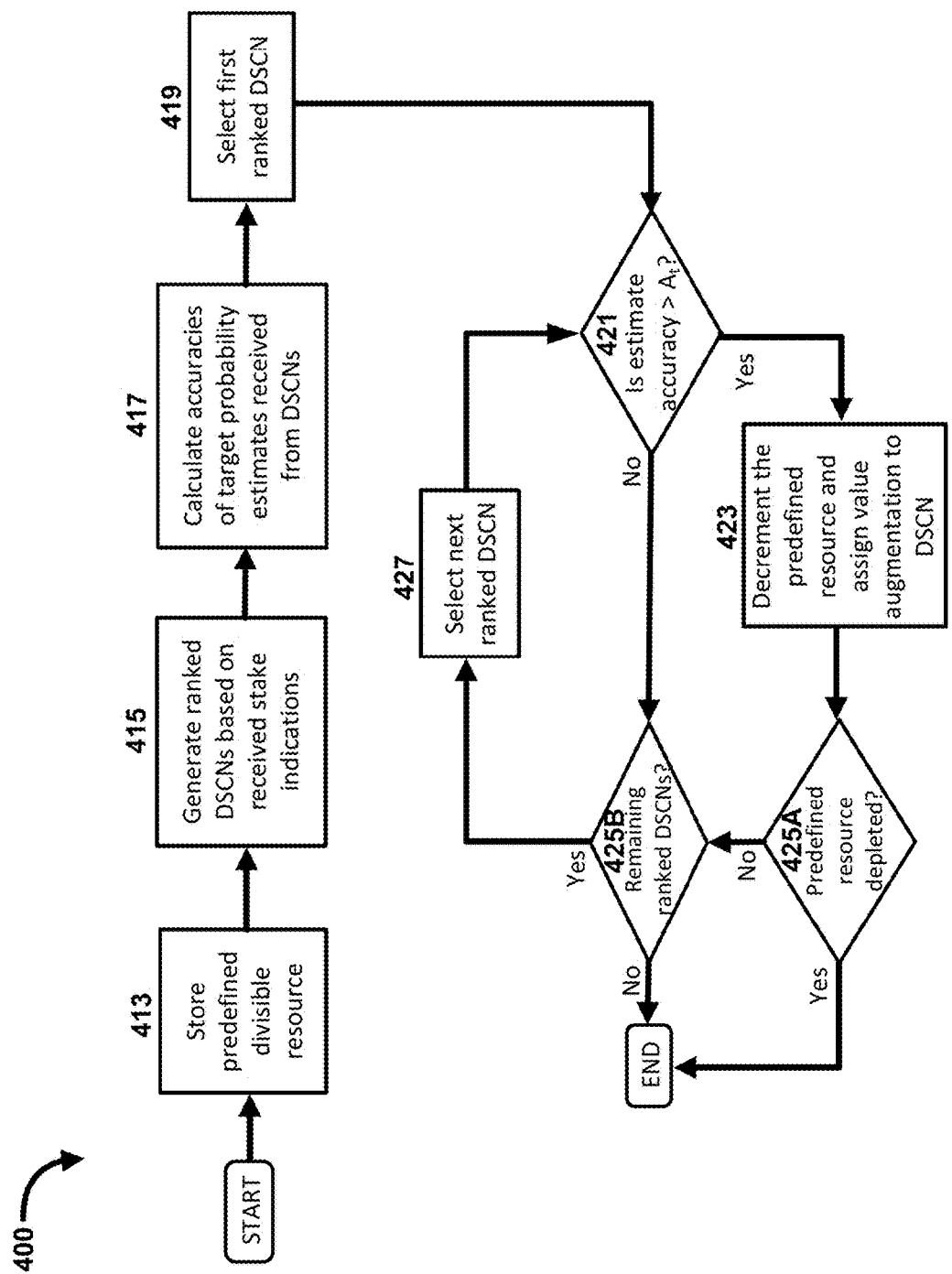
FIG. 4 is a flow diagram showing a process for data source node compute device staking and estimate submission, according to some embodiments.

FIG. 4 is a flow diagram showing a process for data source node compute device staking and estimate submission, according to some embodiments. As shown in FIG. 4, a method 400 includes, at 413, storing, in memory, an indication of a predefined divisible resource. At 415, each data source compute node of a plurality of data source compute nodes is ranked based on indications of stakes received from each data source compute node of the plurality of data source compute nodes, to generate a plurality of ranked data source compute nodes. At 417, an accuracy of a target probability estimate received from the data source compute node is calculated, via a processor and for each data source compute node of the plurality of data source compute nodes, by comparing the received target probability estimate to a stored dataset. At 419, a first ranked data source compute node of the plurality of ranked data source compute nodes is selected. The predefined resource is decremented and a resource balance augmentation (i.e., an award of a portion of the predefined resource) is assigned to the first ranked DSCN (at 423) if the accuracy of the estimate associated with the first ranked DSCN exceeds At at 421, and the process 400 proceeds to step 425A. If the accuracy of the estimate associated with the first ranked DSCN does not exceed At at 421, the process 400 proceeds to step 425B without decrementing or augmenting at 423. At 425A, the system determines whether the predefined resource has been depleted. If not, the process 400 proceeds to step 425B. If it is determined at 425A that the predefined resource has been depleted, the process 400 ends. At 425B, the system determines whether there are remaining ranked DSCNs whose estimates' accuracies have not yet been evaluated. If so, the process 400 proceeds to step 427, where a next ranked DSCN from the plurality of ranked DSCNs is selected, and a determination is again made, at 421, as to whether the estimate associated with that ranked DSCN exceeds At, and the process 400 proceeds as described above. If it is determined at 425B that there are no remaining ranked DSCNs, the process 400 ends.

Figure 5A:
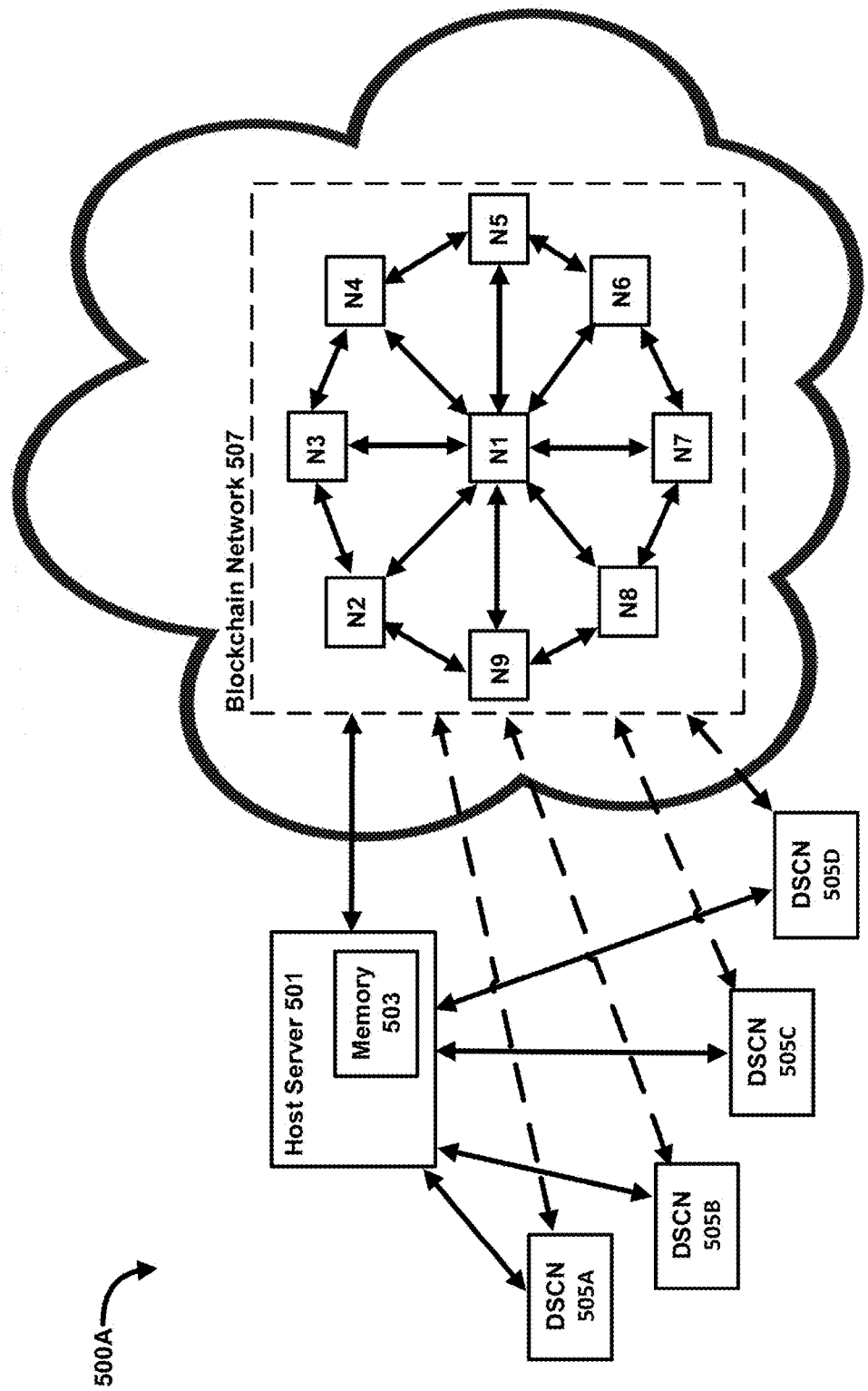
FIG. 5A illustrates a blockchain-based system for the evaluation of proffered machine intelligence, according to some embodiments.

FIG. 5A illustrates a blockchain-based system for the evaluation of proffered machine intelligence, according to some embodiments. The system 400A can be used to implement any method of FIGS. 2-4. As shown in FIG. 5A, a host server 401 includes a memory 403 and is in communication with a plurality of DSCNs 405A-405D. The host server 401 is also in communication with a blockchain network 407 including a plurality of blockchain nodes N1-N9 (or "miners"). Each of the host server 401, DSCNs 405A-405D, and the blockchain network 407 can be part of a cloud-based network. As shown and described above with reference to FIG. 2, each of DSCNs 405-405D can download a first data set from host server 404 as part of a machine intelligence competition, and submit estimates to the host server 403. The first set may be stored in the memory 403 of the host server 401. In addition to submitting estimates to the host server 401, each DSCN 405A-405D can submit a compound stake that references a stake, associated with a quantity or value of crypto-token (or other crypto-currency), and a confidence level. The staking of the crypto-token can be recorded as a transaction on the blockchain network 407, and the validation of the staking transaction can be performed by nodes N1-N9 of the blockchain network 407.

Figure 5B:
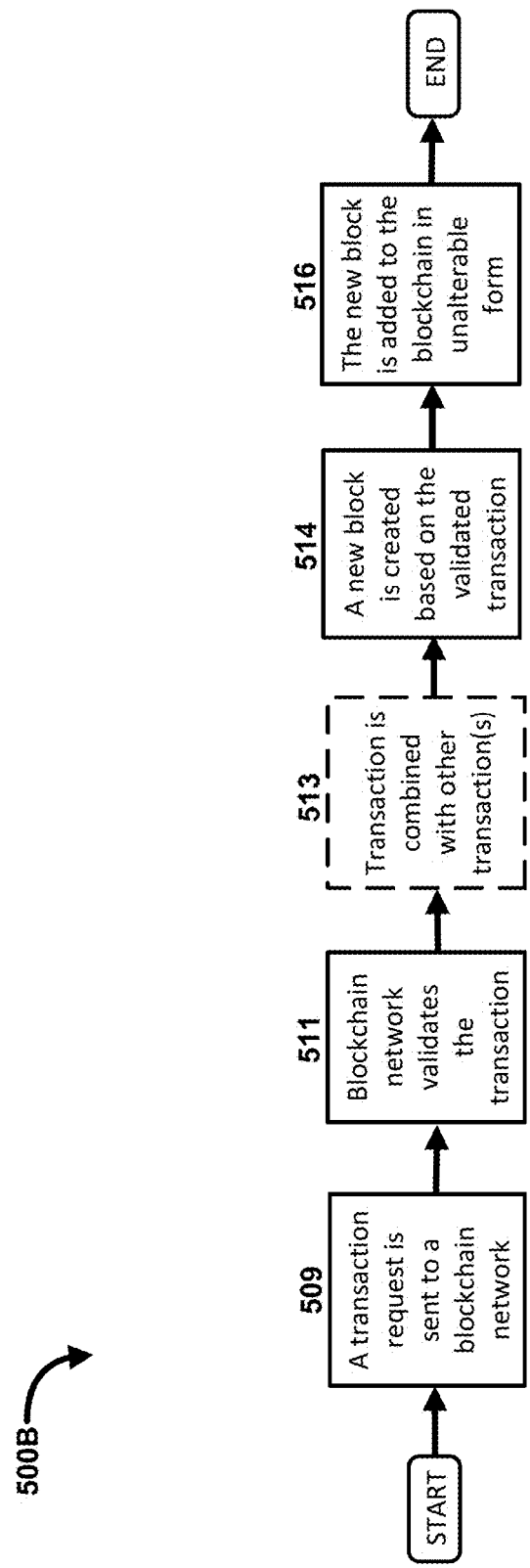
FIG. 5B is a flow diagram illustrating a blockchain transaction implemented according to and compatible with some embodiments of the system of FIG. 5A.

FIG. 5B is a flow diagram illustrating a blockchain transaction compatible with the system of FIG. 5A. The transaction can be associated with one or more of: a staking of a crypto-token, a surrender of a crypto-token, a modification of a crypto-token balance, a transfer of crypto-tokens from one DSCN to another DSCN, and/or the like. As discussed above, the crypto-tokens can be represented and/or transacted by associated smart contracts that are executed on the blockchain (e.g., the Ethereum blockchain). As shown in FIG. 5B, at 409, a transaction request is sent to a blockchain network (e.g., from host server 401 and/or from one or more of DSCNs 405A-405D to blockchain network 407 in FIG. 5A). The blockchain network validates the transaction identified by the transaction request, at 411, and may be combined with one or more other transaction (513). A new block is generated/created based on the validated transaction (optionally in combination with the one or more other transactions) at 414, and then added to the blockchain in unalterable form (516). Adding the new block to the blockchain (516) can include distributing copies of the block from one node of the blockchain network to all other nodes of the blockchain network.

Example Collaborative Machine Learning Tournament

In some embodiments, participants/competitors (e.g., data source compute nodes, "DSCNs") in a machine learning competition/tournament can download training data, submit stakes, upload estimates based on the training data, and/or access user, submission and/or competition information via an application programming interface ("API"). The API can be programmed in a programming language such as Python. Estimates and/or stakes, when uploaded via the API, can be accompanied by an identity token so that the system can verify the identity of the participant. An identity token can include a public identifier ("public ID") and a secret key, both of which can be stored in an API key database in a memory of the system. DSCNs can query the API key database, for example, when a participant is logged into the system, to obtain the public ID and/or the secret key.

A DSCN can retrieve "leaderboard" information for a given competition round via the system's API by sending a signal encoding a query that includes an identifier of the competition round of interest. In response to the signal being received at the system, the system can send a signal encoding a response to the DSCN, the response including information about some or all competitors. The competitor information can include indications of one or more of: concordance, originality, consistency, live Logloss (i.e., a metric evaluating a model's live performance), payment(s), stake(s), submission identifier, total payments, and username. Alternatively or in addition, a DSCN can retrieve "leaderboard" information for a staking competition for a given competition round via the system's API by sending a signal encoding a query that includes an identifier of the competition round of interest. In response to the signal being received at the system, the system can send a signal encoding a response to the DSCN, the response including information about some or all competitors. The competitor information can include indications of one or more of: username, consistency, live Logloss (i.e., a metric evaluating a model's live performance), validation Logloss (i.e., a metric evaluating a model's performance during a model verification stage), and stake attributes, such as confidence, date/time of the stake, soc (stake divided by confidence, s/c), txHash (a transaction hash/unique identifier for Ethereum transactions), and value.

Depending upon the implementation, one or more of the following can also be retrieved/fetched from a memory (e.g., a database record stored in memory) of the system via the API: (1) information about all competitions (e.g., dataset identifier(s), round number, date/time the competition "opened" or began, date/time the competition "resolved" or ended, a general resolved parameter (i.e., an indication as to whether the general tournament is resolved/ended (the users not staking)), and/or a resolved staking parameter (i.e., an indication as to whether the staking is resolved/paid out); (2) a number of a current round; (3) model submission identifiers and associated usernames; (4) submission status associated with a model submission identifier and/or with a last submission made within the same session.; (5) user information (e.g., API token(s), token name, token public ID, token scope, assigned Ethernet address, available crypto-token balance, available value (e.g., fiat money) balance, an indication of whether the user is banned, a user identifier, a date/time that the user was added to memory, an MFA enabled indicator (an indication of whether 2-factor authentication is enabled), a status, and a username); (6) payment information (e.g., crypto-token amount, value amount, tournament identifier, and round identifiers such as number, date/time opened, date/time resolved, etc.); (7) transaction information (e.g., crypto-token deposit information, crypto-token withdrawal information, and value withdrawal information, each including details such as date/time, amount, to, from, posted, send time, status, transaction hash, etc.); and (8) stakes (e.g., indications of confidence, staker (e.g., the DSCN that submitted the stake), status of the stake, transaction hash, value, etc.).

As discussed above, a DSCN can commence or request participation in the machine learning competition/tournament by submitting a stake, at which point the DSCN may be said to a participant in a "staking competition." The stake can include: (1) an indicator of a confidence level (i.e., a quantitative indication of confidence that the estimate will be accurate or will have an accuracy that exceeds a predetermined threshold); and/or (2) a value representing an amount of crypto-tokens that are being staked. In response to a DSCNs submission of a stake to the system can trigger a response sent from the system to the DSCN, the response including one or more of a stake identifier (stake ID), a status of the stake (e.g., pending, returned, or surrendered), a transaction hash (e.g., a hash associated with the recording of the staking transaction on a blockchain), and a value of the stake (e.g., in terms of crypto-token quantity, cryptocurrency value, fiat money value, etc.).

In some embodiments, access to any of the foregoing information via the API can be access-controlled. In other words, grants of access to the information can be conditioned upon the submission of a valid credential or credential pair (e.g., login name and password) and/or based on a privilege level associated with the DSCN that is attempting to access the information. For example, records of a database stored in the memory of the system can include associations between DSCNs and privilege levels and/or between DSCNs and associated credential data.

Originality and Concordance Assessments

In some embodiments, a machine learning competition/tournament is preceded by (or includes as a first step) a verification that a submission (e.g., a set of estimates) from a participant DSCN is "original" (e.g., has not previously been submitted, via a prior tournament, or does not represent an application of a known algorithm, such as a linear model). A submission can be referred to as a "candidate" submission. The originality of a candidate submission can be determined based on a statistical comparison between a score generated based on a collection of previous submissions and/or estimates that would result from known algorithms, and a score generated based on the candidate submission currently being considered (i.e., the submission whose originality is being evaluated). If the score associated with the candidate submission falls below a first predetermined threshold, the candidate submission is identified as being identical or substantially identical to a previous submission, and therefore not original and excluded from the competition. If the score associated with the candidate submission falls below a second predetermined threshold, it is identified as being "similar" to a previous submission, and further analysis can be performed. The further analysis can include determining a count of how many prior submissions the candidate model submission is similar to. If the count is greater than a predetermined threshold value, the candidate submission is identified as not original, and is excluded from the competition. In some implementations, a two-sample Kolmogorov-Smirnov test is used to check originality (i.e., to determine whether two samples—the candidate submission and a known data set—come from the same distribution or algorithm), optionally in combination with a Pearson correlation. Example pseudo-code for performing originality evaluations is as follows:

```
var curr_submission, similar_count=0, max_similar=1
for submission in get_previous_submissions(curr_submission['date_created']):
    var ks_score=two_sample_ks(curr_submission, sub)
    if ks_score<equal-_threshold:
        not_original
    else if k_score<similar_threshold:
        similar_count >=1
if similar_count>=max_similar:
    not_original
else:
    original
```

Alternatively or in addition, a machine learning competition/tournament is preceded by a "concordance" check to ensure that a model associated with a submission is not internally inconsistent or "shifting." In other words, the host system can analyze a candidate submission to detect whether all or substantially all of its estimates are derived from a common distribution. A concordance check can be performed, for example, by applying k-means clustering and then comparing the clusters (e.g., using the Kolmogorov-Smirnov statistic).

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

All combinations of the methods, systems, apparatuses, tools, features, and concepts disclosed herein (provided such are not mutually inconsistent) are contemplated as being part of the subject matter disclosed herein. Terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of " "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
receiving, at a processor and from each data source compute node from a plurality of data source compute nodes, an estimate from a plurality of estimates, each estimate from the plurality of estimates being based on a first data;
receiving, at the processor, an indication of a plurality of stakes, each stake from the plurality of stakes being associated with a data source compute node from the plurality of data source compute nodes;
storing, in memory, an indication of a predefined feedback resource associated with a smart contract;
ranking each data source compute node from the plurality of data source compute nodes based on the plurality of stakes, to generate a plurality of ranked data source compute nodes;
calculating an accuracy of each estimate from the plurality of estimates by comparing each estimate from the plurality of estimates to second data;
for a first ranked data source compute node from the plurality of ranked data source compute nodes:
decrementing the predefined feedback resource and assigning a token augmentation to the first ranked data source compute node if the accuracy of the estimate associated with the first ranked data source compute node has a logloss of less than a first predefined threshold; and
for each remaining ranked data source compute node from the plurality of ranked data source compute nodes:
determining a value associated with the predefined feedback resource; and
if the value is greater than zero, decrementing the predefined feedback resource and assigning a token augmentation to that ranked data source compute node if the accuracy of the estimate associated with that ranked data source compute node exceeds a second predefined threshold.

2. The method of claim 1, further comprising:
receiving, from each data source compute node from the plurality of data source compute nodes, an associated indication of a confidence level, thereby defining a plurality of indications of confidence levels,
the ranking each data source compute node from the plurality of data source compute nodes being further based on the plurality of indications of confidence levels.

3. The method of claim 1, wherein the predefined resource is defined by a smart contract, and decrementing the predefined resource includes one of modifying the smart contract or replacing the smart contract.

4. A method, comprising:
ranking each data source compute node from a plurality of data source compute nodes based on a plurality of stakes, each stake from the plurality of stakes being associated with a data source compute node from the plurality of data source compute nodes, to generate a plurality of ranked data source compute nodes;
calculating an accuracy of each estimate from a plurality of estimates based on a second data, each estimate from the plurality of estimates being associated with a data source compute node from the plurality of data source compute nodes and based on a first data;
for a first ranked data source compute node from the plurality of ranked data source compute nodes:
decrementing a predefined resource and assigning a token augmentation to the first ranked data source compute node if the accuracy of the estimate associated with the first ranked data source compute node exceeds a predefined threshold; and
for each remaining ranked data source compute node from the plurality of ranked data source compute nodes:
determining a value associated with the predefined resource;
if the value is greater than zero, decrementing the predefined resource and assigning a token augmentation to that ranked data source compute node if the accuracy of the estimate associated with that ranked data source compute node exceeds the predefined threshold.

5. The method of claim 4, further comprising receiving, from each data source compute node from the plurality of data source compute nodes, an associated indication of a confidence level, thereby defining a plurality of indications of confidence levels, wherein the ranking each data source compute node from the plurality of data source compute nodes is further based on the plurality of indications of confidence levels.

6. The method of claim 4, wherein the predefined resource is defined by a smart contract, and decrementing the predefined resource includes one of modifying the smart contract or replacing the smart contract.

7. The method of claim 4, further comprising:
calculating, via the processor, a consistency of each estimate from the plurality of estimates,
decrementing the predefined resource and assigning the token augmentation to the first ranked data source compute node being predicated on the estimate associated with the first ranked data source compute node having a consistency of at least 75%.

8. A method, comprising:
receiving, at the host node, an indication of a plurality of stakes, each stake from the plurality of stakes being associated with a data source compute node from a plurality of data source compute nodes;
sending, in response to receiving the indication of the plurality of stakes, a stake identifier to each data source compute node from the plurality of data source compute nodes;
receiving, at the host node and from each data source compute node from the plurality of data source compute nodes, a target estimate from a plurality of target estimates, each target estimate from the plurality of target estimates being based on a first data and associated with a target data; and
calculating, at the host node and for each target estimate from the plurality of target estimates, a predictive accuracy value associated with that target estimate, thereby defining a plurality of predictive accuracy values;
storing the plurality of predictive accuracy values;
for a first data source compute node from the plurality of data source compute nodes:
decrementing a predefined divisible resource and assigning a value augmentation to the first data source compute node if the predictive accuracy value associated with the first data source compute node exceeds a predefined threshold; and
for each remaining data source compute node from the plurality of data source compute nodes:
determining a value associated with the predefined divisible resource, and
if the value associated with the predefined divisible resource is greater than zero, decrementing the predefined divisible resource and assigning a value to that data source compute node if the predictive accuracy value associated with that data source compute node exceeds the predefined threshold.

9. The method of claim 8, wherein the first data includes at least one of:
the target data, feature data, or identifier data.

10. The method of claim 8, wherein the first data includes at least one of:
era data or indications of data type.

11. The method of claim 8, further comprising calculating, at the host node and for each target estimate from the plurality of target estimates, at least one of: a consistency value associated with that target estimate, an originality value associated with that target estimate, or a concordance value associated with that target estimate.

12. The method of claim 8, further comprising:
calculating, at the host node and for each target estimate from the plurality of target estimates, at least two of: a consistency value associated with that target estimate, an originality value associated with that target estimate, or a concordance value associated with that target estimate, thereby defining at least two of: a plurality of consistency values, a plurality of originality values, or a plurality of concordance values.

13. The method of claim 12, further comprising:
sending a signal to cause display of the at least two of: the plurality of consistency values, the plurality of originality values, or the plurality of concordance values via each data source compute node from the plurality of data source compute nodes.

14. The method of claim 8, further comprising:
sending, in response to receiving the indication of the plurality of stakes, and to each data source compute node from the plurality of data source compute nodes, at least one of: a stake status, a transaction hash, or an indication of a stake value.

15. A non-transitory, processor-readable medium storing instructions to cause a processor to:
rank each data source compute node from a plurality of data source compute nodes based on an indication of a plurality of stakes associated with each data source compute node from the plurality of data source compute nodes, to generate a plurality of ranked data source compute nodes;

calculate, for each data source compute node from the plurality of data source compute nodes, an accuracy of a target probability estimate received from that data source compute node by comparing the received target probability estimate to a stored dataset;

for a first ranked data source compute node from the plurality of ranked data source compute nodes:

decrement a predefined divisible resource and assign a value augmentation to the first ranked data source compute node if the accuracy of the target probability estimate associated with the first ranked data source compute node exceeds a predefined threshold; and for each remaining ranked data source compute node of the plurality of ranked data source compute nodes:
 determine a value associated with the predefined divisible resource; and
 if the value is greater than zero, decrement the predefined divisible resource and assign a value augmentation to the ranked data source compute node if the accuracy of the target probability estimate associated with the ranked data source compute node exceeds the predefined threshold.

16. The non-transitory, processor-readable medium of claim 15, wherein the accuracy of the target probability estimate associated with the first ranked data source compute node exceeds the predefined threshold if logloss <−ln (0.5).

17. The non-transitory, processor-readable medium of claim 15, further storing instructions to cause the processor to:

calculate, for a data source compute node from the plurality of data source compute nodes, a consistency value associated with the target probability estimate received from that data source compute node; and exclude that data source compute node from the plurality of ranked data source compute nodes if the consistency value is below 75%.

18. The non-transitory, processor-readable medium of claim 15, wherein the instructions to rank the data source compute nodes includes instructions to rank the data source compute nodes further based on indications of confidence received from each data source compute node from the plurality of data source compute nodes.

19. The non-transitory, processor-readable medium of claim 15, wherein the value augmentation has a value of s/c, where "s" is associated with the indication of stake, and "c" is associated with the indication of confidence.

20. The non-transitory, processor-readable medium of claim 15, further storing instructions to cause the processor to send, to each data source compute node from the plurality of data source compute nodes and based on the indication of the plurality of stakes, at least one of: a stake status, a transaction hash, or an indication of a stake value.

* * * * *